(12) United States Patent
Ozaki et al.

(10) Patent No.: US 9,075,234 B2
(45) Date of Patent: Jul. 7, 2015

(54) TABULAR MEMBER SWINGING DEVICE

(75) Inventors: Takashi Ozaki, Aichi-gun (JP); Ryo Kodama, Aichi-gun (JP)

(73) Assignee: KABUSHIKI KAISHA TOYOTA CHUO KENKYUSHO, Aichi (JP)

( * ) Notice: Subject to any disclaimer, the term of this patent is extended or adjusted under 35 U.S.C. 154(b) by 228 days.

(21) Appl. No.: 13/394,699

(22) PCT Filed: Dec. 14, 2010

(86) PCT No.: PCT/JP2010/072482
§ 371 (c)(1),
(2), (4) Date: Mar. 7, 2012

(87) PCT Pub. No.: WO2011/078015
PCT Pub. Date: Jun. 30, 2011

(65) Prior Publication Data
US 2012/0169702 A1 Jul. 5, 2012

(30) Foreign Application Priority Data
Dec. 22, 2009 (JP) .................................. 2009-291361

(51) Int. Cl.
*G09G 3/34* (2006.01)
*G02B 26/08* (2006.01)

(52) U.S. Cl.
CPC .............. *G02B 26/0841* (2013.01); *G09G 3/34* (2013.01)

(58) Field of Classification Search
CPC .............. G02B 26/0841; G02B 6/357; G02B 26/0833; G09G 3/346; G09G 3/34; G09G 3/3433
USPC .............. 345/211, 84–86; 359/230, 237–324; 348/755, 758, 759
See application file for complete search history.

(56) References Cited

U.S. PATENT DOCUMENTS

| 6,552,840 B2 * | 4/2003 | Knipe ........................... 359/291 |
| 7,289,256 B2 * | 10/2007 | Cummings et al. ........... 359/238 |
| 7,302,157 B2 * | 11/2007 | Chui ............................. 385/147 |

(Continued)

FOREIGN PATENT DOCUMENTS

| JP | A-2004-101553 | 4/2004 |
| JP | A-2008-515002 | 5/2008 |

OTHER PUBLICATIONS

International Search Report issued in International Application No. PCT/JP2010/072482 dated Jan. 18, 2011 (with trans).

*Primary Examiner* — Temesgh Ghebretinsae
*Assistant Examiner* — Michael J Jansen, II
(74) *Attorney, Agent, or Firm* — Oliff PLC

(57) ABSTRACT

A plurality of movable units is arranged in a matrix. First and second electrodes are used in common in the movable units arranged in a column. A plurality of third electrodes, which commonly connects tabular members of the movable units arranged in a row, is formed for each row. The drive circuit selects, in order and one by one, the third electrodes. Subsequently, the drive circuit swings the tabular member by applying a bias voltage to the selected third electrode and applying an approach voltage or a separating voltage to a plurality of the first electrodes and second electrodes. During a predetermined period of maintaining a swinging posture, the voltage applied to the third electrodes is maintained as the bias voltage. The tabular member is returned to a non-swinging state by changing the voltage applied to the third electrodes to a reset voltage after the lapse of the predetermined period.

2 Claims, 13 Drawing Sheets

(56) References Cited

U.S. PATENT DOCUMENTS

| | | | |
|---|---|---|---|
| 7,443,568 B2 * | 10/2008 | Chen et al. | 359/290 |
| 7,446,928 B2 * | 11/2008 | Kimura et al. | 359/291 |
| 7,453,579 B2 * | 11/2008 | Kothari et al. | 356/519 |
| 7,505,195 B2 * | 3/2009 | Chen et al. | 359/291 |
| 7,863,799 B1 * | 1/2011 | Godil | 310/309 |
| 7,889,163 B2 * | 2/2011 | Chui et al. | 345/85 |
| 8,194,056 B2 * | 6/2012 | Kothari | 345/204 |
| 8,884,940 B2 * | 11/2014 | Van Lier et al. | 345/210 |
| 2002/0093722 A1 * | 7/2002 | Chan et al. | 359/295 |
| 2005/0206991 A1 * | 9/2005 | Chui et al. | 359/290 |
| 2005/0286113 A1 * | 12/2005 | Miles | 359/291 |
| 2005/0286114 A1 * | 12/2005 | Miles | 359/291 |
| 2006/0044246 A1 * | 3/2006 | Mignard | 345/98 |
| 2006/0044298 A1 * | 3/2006 | Mignard et al. | 345/205 |
| 2006/0044928 A1 * | 3/2006 | Chui et al. | 365/232 |
| 2006/0056000 A1 * | 3/2006 | Mignard | 359/245 |
| 2006/0057754 A1 * | 3/2006 | Cummings | 438/48 |
| 2006/0066542 A1 * | 3/2006 | Chui | 345/85 |
| 2006/0066559 A1 * | 3/2006 | Chui et al. | 345/108 |
| 2006/0066560 A1 * | 3/2006 | Gally et al. | 345/108 |
| 2006/0066561 A1 * | 3/2006 | Chui et al. | 345/108 |
| 2006/0066594 A1 * | 3/2006 | Tyger | 345/204 |
| 2006/0066597 A1 * | 3/2006 | Sampsell | 345/204 |
| 2006/0066598 A1 * | 3/2006 | Floyd | 345/204 |
| 2006/0066601 A1 * | 3/2006 | Kothari et al. | 345/204 |
| 2006/0066863 A1 * | 3/2006 | Cummings et al. | 356/450 |
| 2006/0066935 A1 * | 3/2006 | Cummings et al. | 359/291 |
| 2006/0066937 A1 * | 3/2006 | Chui | 359/291 |
| 2006/0066938 A1 * | 3/2006 | Chui | 359/291 |
| 2006/0067648 A1 * | 3/2006 | Chui et al. | 385/147 |
| 2006/0067653 A1 * | 3/2006 | Gally et al. | 385/147 |
| 2006/0077127 A1 * | 4/2006 | Sampsell et al. | 345/55 |
| 2006/0077145 A1 * | 4/2006 | Floyd et al. | 345/85 |
| 2006/0077146 A1 * | 4/2006 | Palmateer | 345/85 |
| 2006/0077147 A1 * | 4/2006 | Palmateer et al. | 345/85 |
| 2006/0077401 A1 * | 4/2006 | Kothari et al. | 356/614 |
| 2006/0077505 A1 * | 4/2006 | Chui et al. | 359/239 |
| 2006/0077520 A1 * | 4/2006 | Chui et al. | 359/290 |
| 2006/0077523 A1 * | 4/2006 | Cummings et al. | 359/291 |
| 2006/0103613 A1 * | 5/2006 | Chui | 345/85 |
| 2006/0250335 A1 * | 11/2006 | Stewart et al. | 345/84 |
| 2006/0250350 A1 * | 11/2006 | Kothari et al. | 345/108 |
| 2007/0002426 A1 * | 1/2007 | Ogikubo et al. | 359/291 |
| 2007/0007849 A1 * | 1/2007 | Ogikubo et al. | 310/309 |
| 2007/0024550 A1 * | 2/2007 | Chui et al. | 345/84 |
| 2007/0024951 A1 * | 2/2007 | Mochizuki et al. | 359/291 |
| 2007/0024952 A1 * | 2/2007 | Ogikubo et al. | 359/291 |
| 2007/0053652 A1 | 3/2007 | Mignard et al. | |
| 2007/0126673 A1 * | 6/2007 | Djordjev et al. | 345/84 |
| 2007/0147688 A1 * | 6/2007 | Mathew | 382/232 |
| 2007/0170151 A1 * | 7/2007 | Kimura et al. | 218/132 |
| 2007/0229204 A1 * | 10/2007 | Ogikubo et al. | 335/220 |
| 2007/0258124 A1 * | 11/2007 | Chen et al. | 359/245 |
| 2007/0258130 A1 * | 11/2007 | Chen et al. | 359/291 |
| 2008/0074728 A1 * | 3/2008 | Ogikubo et al. | 359/292 |
| 2009/0219309 A1 * | 9/2009 | Sampsell | 345/690 |
| 2009/0219600 A1 * | 9/2009 | Gally et al. | 359/245 |
| 2009/0225069 A1 * | 9/2009 | Sampsell | 345/212 |
| 2009/0273596 A1 * | 11/2009 | Cummings | 345/214 |
| 2010/0026680 A1 * | 2/2010 | Chui et al. | 345/214 |
| 2010/0073392 A1 | 3/2010 | Gally et al. | |
| 2010/0315398 A1 * | 12/2010 | Chui et al. | 345/209 |

* cited by examiner

TABULAR MEMBER SWINGING DEVICE

CROSS-REFERENCE TO RELATED APPLICATION

This application claims priority to Japanese Patent Application No. 2009-291361 filed on Dec. 22, 2009, the contents of which are hereby incorporated by reference into the present application.

TECHNICAL FIELD

The present application relates to a device for swinging a tabular member.

DESCRIPTION OF RELATED ART

With the device disclosed in Japanese Translation of PCT Application No. 2008-515002, a plurality of movable units comprising a tabular member capable of changing its posture is arranged in a matrix in a row direction and a column direction. In order to utilize a matrix-type device comprising the plurality of movable units arranged in a matrix, a drive system for switching the posture of the tabular member in each movable unit, and independent from the other movable units, is required. The device of Translation of PCT Application No. 2008-515002 uses row electrodes existing independently in a same quantity as a number of rows and column electrodes existing independently in the same quantity as the number of columns, selects the row electrode of the row in which the posture of the tabular member is to be switched and applies +5V, and applied 0V to the row electrode of the other rows. Moreover, in that row, −5V is applied to the column electrode of the column in which the tabular member is to approach a substrate, and +5V is applied to the column electrode of the column in which the tabular member is to be separated from the substrate. Consequently, in the row where +5V is being applied to the row electrode, the tabular member of the column in which −5V has been applied to the column electrode approaches the substrate, and the tabular member of the column in which +5V has been applied to the column electrode becomes separated from the substrate. Meanwhile, in the row where 0V is being applied to the electrode, regardless of whether −5V is applied or +5V is applied to the column electrode, the posture of the tabular member does not change. According to this system, the posture of the tabular member can be switched to the intended posture by selecting an arbitrary intersection point, but the posture of the tabular members of the other intersection points does not change pursuant to the foregoing operation. As a result of sequentially switching the row in which +5V is applied to the row electrode, the posture of the tabular member can be switched in all the movable units of the matrix-type device in each movable unit, and independently from the other movable units.

BRIEF SUMMARY OF INVENTION

With the matrix-type device of Japanese Translation of PCT Application No. 2008-515002, when the processing of a certain row is complete, it is necessary to prohibit any new processing to be performed to that row before starting the processing of the next row. For example, in a case of changing the postures of the tabular members in order from a first row, a second row, and a third row, when +5V is applied to the row electrode of the first row and when the processing of the first row is complete, the voltage of the row electrode of the first row is subsequently switched to 0V, and +5V is thereafter applied to the row electrode of the second row and the processing of the second row is thereby executed. If the voltage of the row electrode of the first row is not switched to 0V prior to starting the processing of the second row, the voltage of the column electrode that is applied in the processing of the second row affects the first row, and the first row and the second row cannot be independently controlled. With the conventional technology, when the processing of a specific row is complete, it was necessary to switch to a state of prohibiting the execution of new processing to that row. Thus, much time is required for that processing and the processing start time of the next row is delayed. Moreover, it is necessary to unfailingly observe the order of first switching to a state of prohibiting the performance of new processing and then starting the processing of the next row, and a time margin is required during the period of prohibiting the performance of new processing and then starting the processing of the next row. This also delays the processing start time of the next row.

This specification discloses technology which, when the processing of a specific row is complete, allows the processing of the next row without having to switch to a state of prohibiting the performance of new processing to that row. Thus, this specification discloses a movable unit where it is not necessary to switch to the state of prohibiting the performance of further processing to the processed movable unit, and whereby the completion of processing itself prohibits the performance of any new processing. If it is possible to obtain the movable unit comprising the foregoing characteristics, there is no need to switch to the state of prohibiting new processing. When a one-dimensional array-type device or a two-dimensional matrix-type device is configured from the movable unit comprising the foregoing characteristics, the advantage of not having to switch to the state of prohibiting the new processing is actualized. This specification discloses a technology that is effective in a movable unit that is to be regarded as a unit, and a technology that is effective in the array-type device and the matrix-type device using a plurality of such movable units.

One technology disclosed in the present specification relates to a movable unit which does not need to be switched to a state of prohibiting new processing. A device herein comprises a substrate, a support, a movable beam, a tabular member, a first electrode, a second electrode, and a drive circuit. The support may be fixed to the substrate and extends upward from the substrate. The movable beam may connect the support and the tabular member, support the tabular member about a swing axis such that the tabular member can swing, and exhibit returnability that causes the tabular member to return to a posture that is parallel to the substrate. The tabular member may include a first end and a second end that face each other across the swing axis, and at least a part of the tabular member may be formed of a conductor. The first electrode may be formed on the substrate in a position opposing the first end. The second electrode may be formed on the substrate in a position opposing the second end. The drive circuit may apply one of a first voltage and a second voltage to the tabular member, apply one of a third voltage and a fourth voltage to the first electrode, and apply the other of the third voltage and the fourth voltage to the second electrode. Limitations of the first voltage to fourth voltage are described later. A distance between the first end and the first electrode and a distance between the second end and the second electrode when the tabular member is in a posture that is parallel to the substrate may be assumed as d0. A approach distance when the distance between the first end and the first electrode decreases by a swing of the tabular member may be assumed as d1 and a separation distance when the distance between the second end and the second electrode increases by the swing of the tabular member may be assumed as d2. An approach distance when the distance between the second end and the second electrode decreases by a swing of the tabular member in an opposite direction may be assumed as d1 and a separation distance when the distance between the first end and the first electrode increases by the swing of the tabular member in the opposite direction may be assumed as d2. Under the assumptions, the first voltage to fourth voltage satisfy relationships of (1) to (3) below. (1) When the distance between the first end and the first electrode and the distance between the second end and the second electrode are d0, the first voltage is applied to the tabular member, one of the third voltage and the fourth voltage is applied to the first electrode, and the other of the third voltage and the fourth voltage is applied to the second electrode, a difference in torque applied by the first electrode and torque applied by the second electrode to the tabular member exceeds the returnability. (2) When the second voltage is applied to the tabular member, the difference in the torque applied by the first electrode and the torque applied by the second electrode to the tabular member is less than the returnability. (3) A value of (voltage difference between the third voltage and the first voltage)/(voltage difference between the fourth voltage and the first voltage) is smaller than a value of (separation distance d2)/(approach distance d1).

When the tabular member swings (inclines) in the manner approaching the first electrode, the distance between the first end and the first electrode decreases to the approach distance d1, and the distance between the second end and the second electrode increases to the separation distance d2. Moreover, when the tabular member swings in a manner of approaching the second electrode, the distance between the second end and the second electrode decreases to the approach distance d1, and the distance between the first end and the first electrode increases to the separation distance d2. In other words, the tabular member has a seesaw structure.

The relationship of (1) is now explained. An electrostatic attractive force working between the first electrode and the tabular member becomes the torque which causes the tabular member to swing about the swing axis, and the electrostatic attractive force working between the second electrode and the tabular member becomes the torque which causes the tabular member to swing about the swing axis. Since the directions of the torque in the foregoing two cases are opposite, the difference in the torque of the two cases becomes the effective torque for swinging the tabular member. A magnitude of the electrostatic attractive force working between the end of the tabular member and the electrode is proportional to a square of the voltage difference between the end and the electrode and is inversely proportional to the square of the distance between the end and the electrode. In a state where the tabular member is not swinging, the distance between the first end and the first electrode and the distance between the second end and the second electrode are both d0. In other words, great electrostatic attractive force can be obtained in the foregoing case in comparison to the case when the distance between the end and the electrode increases (becomes d2). The relationship of (1) above means that, when the third voltage is applied to one electrode and the fourth voltage is applied to the other electrode in a state where great electrostatic attractive force can be obtained, the torque difference applied to the tabular member exceeds the returnability, and the tabular member swings by deforming the movable beam. In other words, in a state where the distance between the end and the electrode is d0 and it is possible to obtain an electrostatic attractive force that is greater than the case when it is the separation distance d2, the voltage difference between the third voltage and the fourth voltage is greater as it generates an effective torque that exceeds the returnability of the movable beam.

The relationship of (2) is now explained. The movable unit is demanded of characteristics where is it not processed even when another movable unit is selected and processed, and will not be processed unless that movable unit is selected and processed. From the relationship of (1) above, when the first voltage is applied to the tabular member of the movable unit to be processed, the processing of that movable unit is enabled. In the relationship of (2) above, so as long as the second voltage is applied to the tabular member, since the difference in the torque applied by the first electrode and the torque applied by the second electrode to the tabular member is less than the returnability of the movable beam irrespective of the voltage that is applied to the first electrode and the second electrode, the tabular member does not swing and maintains a posture that is parallel to the substrate. In other words, so as long as the second voltage is applied to the tabular member, even if a voltage is applied to the first electrode and the second electrode for processing another movable unit, the tabular member does not swing in the movable unit to which the second voltage is being applied. It is thereby possible to obtain the characteristics where a movable unit not processed even when another movable unit is selected and processed, and will not be processed unless that movable unit is selected and processed. Moreover, the movable unit is also demanded of characteristics of being able to return the processed movable unit to the previously assumed state before it was processed. In the relationship of (2) above, when the second voltage is applied to the tabular member, the tabular member can be returned to a posture that is parallel to the substrate without having to depend on the voltage state between the first electrode and the second electrode. Since the tabular member can be returned to a posture that is parallel to the substrate prior to utilizing the relationship of (1) above and swinging the tabular member, the processing of swinging the tabular member is enabled in a state where the distance between the end and the electrode is d0 and it is possible to obtain an electrostatic attractive force that is greater than the case of the separation distance d2.

The relationship of (3) is now explained. When the movable unit swings the tabular member, even if a voltage that causes that tabular member to swing in an opposite direction is applied to the first electrode and the second electrode, preferably, the swinging posture is not reversed. This is because, if this is possible, upon performing processing of switching the swinging state of a certain movable unit and proceeding to processing to switch the swinging state of another movable unit, there is no need to switch to a state of prohibiting the performance of new processing to the processed movable unit. In cases where the third voltage is greater than the first voltage and the fourth voltage, based on the relationship of (1) above, when the first voltage is applied to the tabular member, the third voltage is applied to the first electrode and the fourth voltage is applied to the second electrode, the tabular member approaches the first electrode and the distance therebetween becomes d1, and the tabular member becomes separated from the second electrode and the distance therebetween becomes d2. Here, when the third voltage is applied to the first electrode and the fourth voltage is applied to the second electrode for the processing of another movable unit, the swinging direction of the tabular member is not reversed. Meanwhile, when the fourth voltage is applied to the first electrode and the third voltage is applied to the second electrode for the processing of another movable unit, if the swinging direction of the tabular member is reversed, it is necessary to switch to the state of prohibiting the performance of new processing to the processed movable unit before switching the swinging state of the other movable unit. When the value of (voltage difference between the third voltage and the first voltage)/(voltage difference between the fourth voltage and the first voltage) is smaller than the value of (separation distance d2)/(approach distance d1), the magnitude of the electrostatic attractive force working between the tabular member and the electrode is proportional to the square of the voltage difference between the tabular member and the electrode and is inversely proportional to the square of the distance between the tabular member and the electrode. Thus, in cases where the distance between the tabular member and the first electrode is d1 and the distance between the tabular member and the second electrode is d2, even if the first voltage is applied to the tabular member, the fourth voltage is applied to the first electrode and the third voltage is applied to the second electrode, based on the relationship of the distance and the voltage difference, the relationship where the torque applied by the first electrode to the tabular member being greater than the torque applied by the second electrode to the tabular member is maintained. In the relationship of (3) above, it is possible to obtain the characteristics where, when the tabular member is swung, even if a voltage that causes That tabular member to swing in an opposite direction is applied to the first electrode and the second electrode, the swinging posture is not reversed, and, upon performing processing of switching the swinging state of a certain movable unit and proceeding to processing of switching the swinging state of another movable unit, there is no need to switch to the state of prohibiting the performance of new processing to the processed movable unit.

With the device of the present application, based on the relationship of (1) above, the swingable state of the tabular member can be realized by applying the first voltage to the tabular member through application of a voltage to the first electrode and the second electrode, based on the relationship of (2) above, the tabular member can be returned to a posture that is parallel to the substrate or the posture that is parallel to the substrate can be maintained by applying the second voltage to the tabular member without having to depend on the application of the voltage to the first electrode and the second electrode, and, based on the relationship of (3) above, in a state where the first voltage is continuously applied to the tabular member of the movable unit in which the tabular member is swinging, even if a voltage which reverses the swinging direction of the tabular member is applied to the first electrode and the second electrode for the processing of another movable unit, the swinging direction of the tabular member is not reversed. With the processed movable unit, it is possible to obtain the characteristics where, even without having to switch to the state of prohibiting the performance of new processing, the performance of new processing is prohibited based on the completion of processing itself.

Note that the foregoing device has various applications. For example, by forming a mirror on the tabular member, it is possible to realize an optical deflector for changing the reflecting direction of a light beam. Moreover, it is also possible to realize a storage apparatus for changing and storing the capacitance between the tabular member and the electrode. Furthermore, it is also possible to realize a relay device for switching a contact switch based on an swinging tabular member.

The characteristics of the foregoing movable device can be effectively utilized by combining a plurality of movable units. The device comprising the plurality of movable units may comprise the following configuration. The device may comprise a plurality of movable units comprising the movable beam, the tabular member, the first electrode and the second electrode. The first electrode of each movable unit may be commonly connected to a drive circuit. The second electrode of each movable unit may be commonly connected to the drive circuit. The tabular member of each movable unit may be individually connected to the drive circuit. A voltage difference between a third voltage and a first voltage may be greater than a voltage difference between a fourth voltage and the first voltage. When the drive circuit may select one of the movable units in which the tabular member is swinging and the movable units in which the tabular member is not swinging, apply the first voltage to the tabular member of the selected movable unit, apply the second voltage to the tabular member of the remaining movable units, apply one of the third voltage and the fourth voltage commonly to the first electrode of the plurality of movable units, and apply the other of the third voltage and the fourth voltage commonly to the second electrode of the plurality of movable units. Then, the following events may occur in the plurality of movable units. (a) In one movable unit among the movable units in which the tabular member is not swinging and in which the first voltage has been applied to the tabular member, the tabular member may swing in a direction approaching the electrode to which the third voltage has been applied. (b) In one movable unit among the movable units in which the tabular member is not swinging and in which the second voltage has been applied to the tabular member, the tabular member may not swing. (c) In the movable unit in which the tabular member is swinging and in which the first voltage has been applied to the tabular member, the tabular member may maintain a previously assumed swinging posture, and in the movable unit in which the drive circuit has applied the second voltage to the tabular member, the tabular member may return to a posture that is parallel to the substrate.

The event of (a) above selects a movable unit to be processed among the movable units in which the tabular member is not swinging, and causes the tabular member to swing. Specifically, the first voltage is applied to the tabular member, one of the third voltage and the fourth voltage is applied to the first electrode, and the other of the third voltage and the fourth voltage is applied to the second electrode. Consequently, the tabular member swings in the direction of approaching the electrode to which the third voltage has been applied. The event of (b) above does not swing the tabular member of the movable unit that is not to be processed among the movable units in which the tabular member is not swinging. Specifically, the second voltage is applied to the tabular member of the movable unit that is not to be processed. In the foregoing case, even if one of the third voltage and the fourth voltage is applied to the first electrode and the other voltage is applied to the second electrode, the tabular member of the movable unit that is not to be processed in which the second voltage is being applied to the to the tabular member will not swing. The event of (c) above retains and stores the swinging posture with a movable unit in which the tabular member has already swung. Specifically, the swinging posture is maintained as a result of the first voltage being applied to the tabular member. For example, when the first voltage is applied to the tabular member, the third voltage is applied to the first electrode and the fourth voltage is applied to the second electrode, the tabular member swings in the direction of approaching the first electrode. Once it swings, that swinging direction is not reversed so as long as the first voltage is continuously applied to the tabular member. For example, even when the fourth voltage is applied to the first electrode and the third voltage is applied to the second electrode in order to swing the tabular member of another movable unit, the tabular member that swung in the direction of approaching the first electrode will maintain its posture. In addition, with the movable unit in which the drive circuit has applied the second voltage to the tabular member, the tabular member returns to the posture that is parallel to the substrate. Consequently, the swung tabular member can be returned to the non-swinging posture.

As a result of using the events of (a) and (b) above, it is possible to realize an operation of swinging only the tabular member of one newly selected movable unit, and not swinging the tabular member of a not-yet-selected movable unit. It is possible to select a specific movable unit and swing the tabular member. Once the tabular member is swung, the swung posture is maintained until the processing of returning it to its original state is performed. In this specification, the swing of the tabular member is sometimes referred to as processing, writing or storing. Based on the event of (c) above, even if a voltage for reversing the swinging direction of the tabular member that is already swinging for the processing of another movable unit, the swung tabular member is not reversed. Thus, there is no need to switch to the state of prohibiting the performance of new processing to a processed movable unit prior to processing another movable unit. In addition, by applying the second voltage to the tabular member, the swung tabular member can be returned to a posture before it was swung. Accordingly, the movable units can be processed one by one while commonly applying a voltage to the first electrode of the plurality of movable units and commonly applying a voltage to the second electrode of the plurality of movable units, and there is no need to switch to the state of prohibiting the performance of new processing to the processed movable unit prior to processing another movable unit. An arbitrary pattern can be formed with the plurality of movable units.

With the device of the present application, there is no restriction of not being able to apply the first voltage to the tabular member of a new movable unit unless the voltage applied to the processed tabular member is switched from the first voltage to the second voltage. Consequently, it is possible to shorten the time required for processing the plurality of movable units and simplify the drive circuit.

The technique disclosed in the present specification is especially useful in a case where a plurality of movable units is arranged in a matrix in a row direction and a column direction. In this case, the following configuration may be adopted. (1) The swing axis provided to each of the movable units may be shaped in a manner extending in the column direction. (2) A first electrode of each of the movable units arranged in the column direction may be commonly connected to a drive circuit. (3) The first electrode of each of the movable units of different columns may be individually connected to the drive circuit. (4) A second electrode of each of the movable units arranged in the column direction may be commonly connected to the drive circuit. (5) The second electrode of each of the movable units of different columns may be individually connected to the drive circuit. (6) The tabular member of each of the movable units arranged in a row direction may be commonly connected to the drive circuit. (7) The tabular member of each of the movable units of different rows may be individually connected to the drive circuit. The drive circuit may perform the following operation. (A) The drive circuit may select a processed row and one row to be processed, apply a first voltage to the tabular members of the movable units belonging to the selected row, and apply a second voltage to the tabular members of the movable units belonging to remaining rows. (B) In the one row to be processed, the drive circuit may apply a third voltage to the first electrode and apply a fourth voltage to the second electrode in the column where the tabular member is to approach the first electrode, and apply the fourth voltage to the first electrode and apply the third voltage to the second electrode in the column where the tabular member is to approach the second electrode. (C) The drive circuit may switch the voltage that is being applied to the tabular members at a predetermined point in time from the first voltage to the second voltage.

According to the above, the two-dimensional matrix is formed by arranging the movable units in the row direction and the column direction. In addition, it is possible to switch (write) the posture of the tabular member one row at a time. Moreover, the written state can be stored by continuing to apply the first voltage to the processed row. An arbitrary pattern can be formed with movable units formed in the two-dimensional matrix. Since there is no restriction of not being able to apply the first voltage to the tabular member of a new movable unit unless the voltage applied to the processed tabular member is switched from the first voltage to the second voltage, the time required for completing the processing of all movable units can be shortened.

In the foregoing example, an ground voltage can be used as the second voltage and the fourth voltage. In the foregoing case, to apply the second voltage means to ground, and means that no voltage is applied. Similarly, to apply the fourth voltage means to ground, and means that no voltage is applied. In the foregoing case, if the first voltage is a positive voltage then the third voltage is a negative voltage, and if the first voltage is a negative voltage then the third voltage is a positive voltage.

According to the present technology, it is possible to shorten the writing time and simplify the drive circuit.

DETAILED DESCRIPTION OF INVENTION

Preferred embodiments of the present invention can be realized, for example, based on the examples comprising the following features.
(Feature 1) The drive circuit performs a drive method (sequential refresh method) of writing a new swinging posture upon resetting the stored swinging posture to a horizontal state one row at a time.
(Feature 2) The drive circuit performs a drive method (concurrent refresh method) of writing a new swinging posture one row at a time upon resetting the stored swinging posture to a horizontal state regarding all movable units that are arranged in a matrix.

First Embodiment

Figure 1:
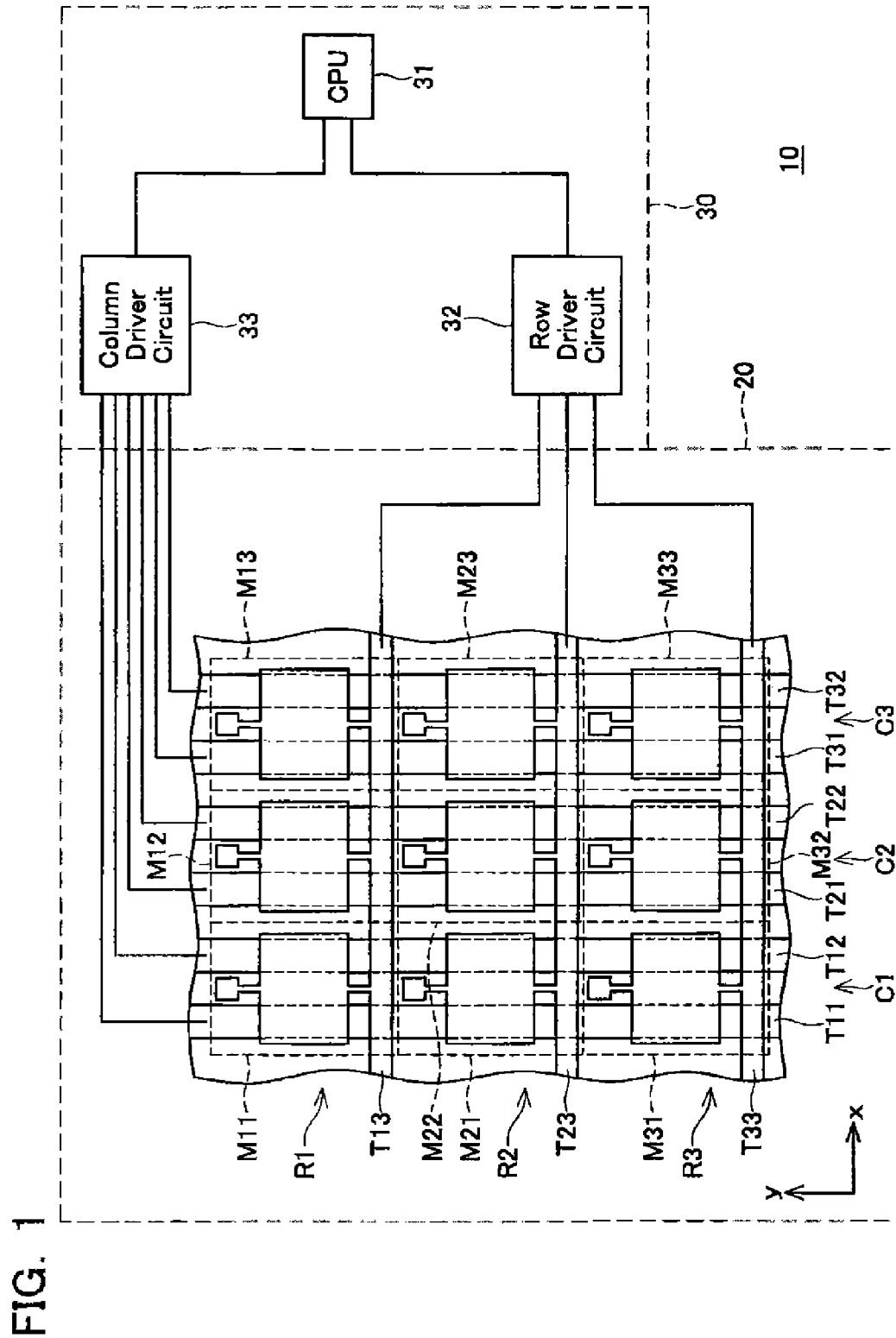
FIG. 1 shows a top view of an optical deflector in one embodiment (No. 1).
Figure 2:
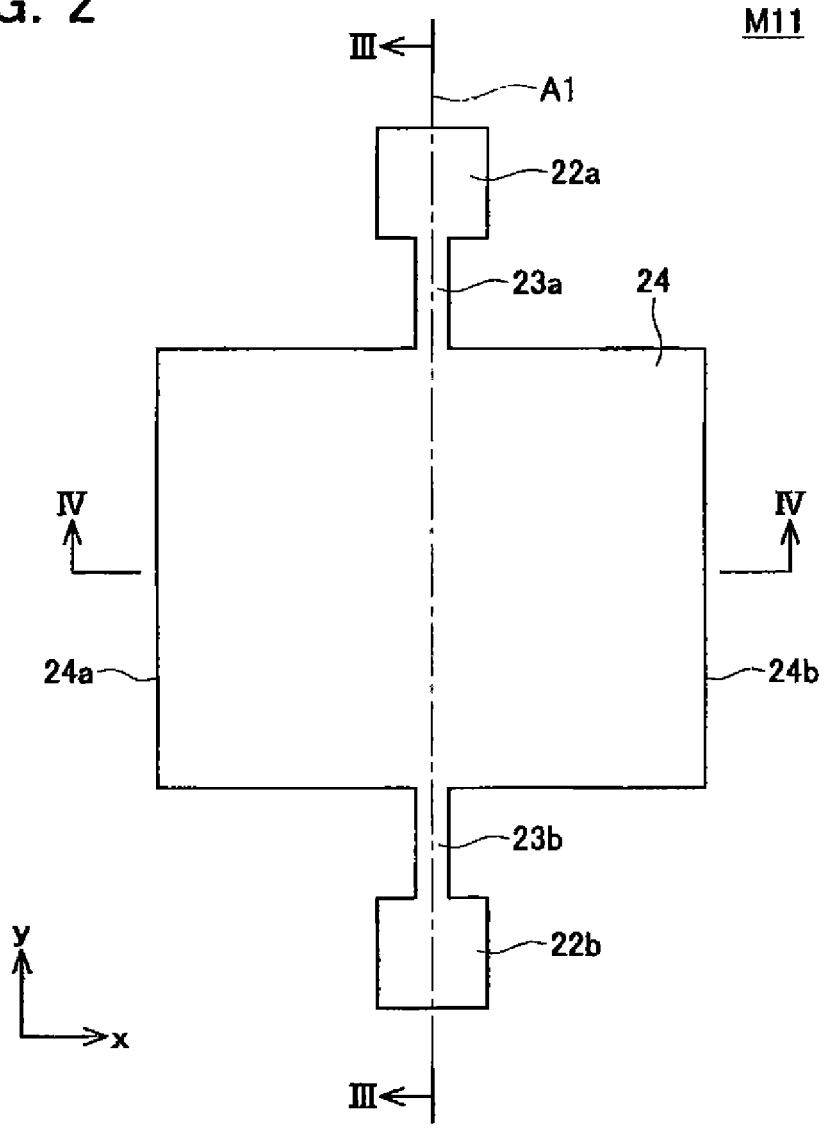
FIG. 2 shows a top view of the optical deflector in one embodiment (No. 2).

FIG. 1 and FIG. 2 show schematic configurations of an optical deflector 10 of this embodiment. FIG. 1 is a top view and a block diagram of the optical deflector 10. The optical deflector 10 comprises a matrix section 20, and a drive circuit 30. The matrix section 20 is prepared via an MEMS process, and the drive circuit 30 is prepared via a CMOS process. Accordingly, by forming the matrix section 20 and the drive circuit 30 via separate processes, it is possible to prevent the deterioration of the yield. Thus, it is possible to reduce the production cost of the optical deflector 10.

The matrix section 20 is now explained. As an example, a case where nine movable units M11 to M33 are arranged in a matrix of 3 rows×3 columns on the matrix section 20 is explained. Note that the movable units arranged on the matrix section 20 are not limited to the matrix of 3×3, and it goes without saying that it can be expanded to a matrix of N×M (N, M are natural numbers).

In a first column C1, three movable units M11, M21, M31 are arranged in the column direction (y direction) on the same plane. In addition, a pair of a first electrode T11 and a second electrode T12 is commonly connected to the movable units M11, M21, M31. The first electrode T11 and the second electrode T12 have a shape of extending in parallel to the y direction (column direction) like a rail. Similarly, in a second column C2, the movable units M12, M22, M32 are arranged in the column direction, and commonly connected via a pair of a first electrode T21 and a second electrode T22. Moreover, in a third column C3, the movable units M13, M23, M33 are arranged in the column direction, and commonly connected via a pair of a first electrode T31 and a second electrode T32.

In a first row R1, three movable units M11, M12, M13 are arranged in the row direction (x direction). In addition, a third electrode T13 is commonly connected to the movable units M11, M12, M13. Similarly, in a second row R2, the movable units M21, M22, M23 are arranged in the row direction, and commonly connected via a third electrode T23. Moreover, in a third row R3, the movable units M31, M32, M33 are arranged in the row direction, and commonly connected via a third electrode T33.

The drive circuit 30 is now explained. The drive circuit 30 comprises a CPU 31, a row driver circuit 32, and a column driver circuit 33. The CPU 31 is communicably connected to the row driver circuit 32 and the column driver circuit 33. The third electrodes T13 to T33 are connected to the row driver circuit 32. A bias voltage V1 (−8.5(V)) or a reset voltage V2 (0(V)) is applied to the third electrodes T13 to T33 by the row driver circuit 32. Connected to the column driver circuit 33 are the first electrode T11 and the second electrode T12 of the first column C1, the first electrode T21 and the second electrode T22 of the second column C2, and the first electrode T31 and the second electrode T32 of the third column C3. With the movable units M11, M21, M31 belonging to the first column C1, the column driver circuit 33 applies an approach voltage V3 (3(V)) to the first electrode T11 and applies a separating voltage V4 (0(V)) to the second electrode T12 in order to cause the first end 24a to swing in a manner approaching the first electrode T11 as described later. Meanwhile, when causing the second end 24b to swing in a manner approaching the second electrode T12, the column driver circuit 33 applies the approach voltage V3 (3(V)) to the second electrode T12 and applies the separating voltage V4 (0(V)) to the first electrode T11. The same applies to the second column C2 and the third column C3, and the approach voltage V3 (3(V)) is applied to the electrode on the side to which the end is to approach, and the separating voltage V4 (0(V)) is applied to the electrode on the side from which the end is to be separated. Note that the bias voltage V1 corresponds to the first voltage, the reset voltage V2 corresponds to the second voltage, the approach voltage V3 corresponds to the third voltage, and the separating voltage V4 corresponds to the fourth voltage.

Figure 3:
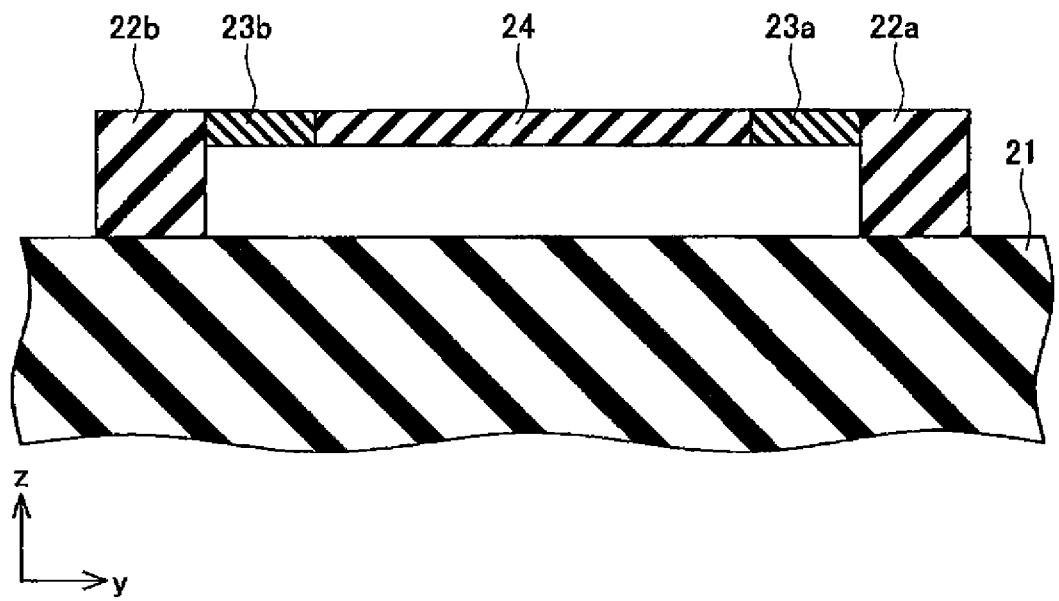
FIG. 3 shows a cross section of the optical deflector in one embodiment (No. 1).
Figure 4:
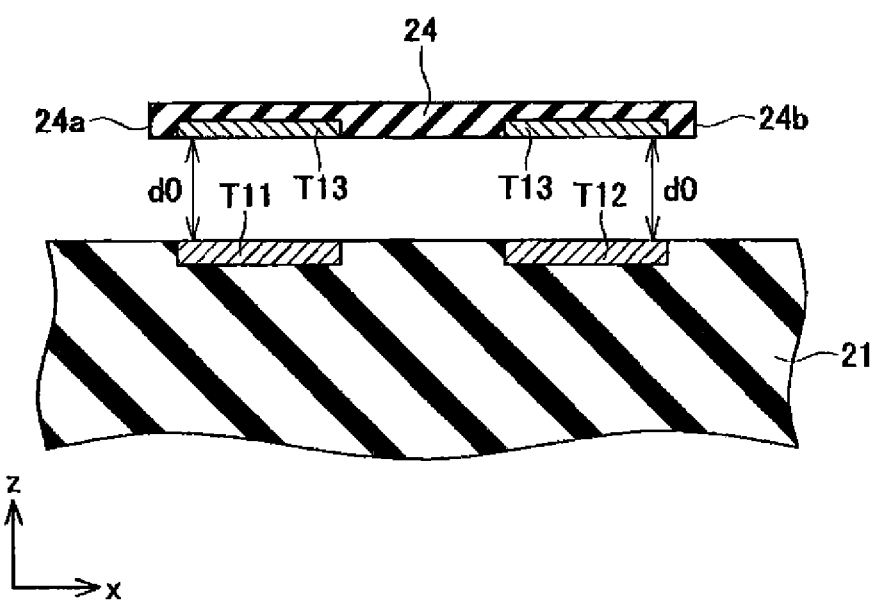
FIG. 4 shows a cross section of the optical deflector in one embodiment (No. 2).

The configuration of the movable units M11 to M33 is now explained. Note that the movable units M11 to M33 are structured the same. Thus, as an example, the configuration of the movable unit M11 is explained with reference to FIG. 2 to FIG. 4. FIG. 2 is a top view FIG. 3 is a III-III-line cross section. FIG. 4 is a IV-IV-line cross section. The movable unit M11 comprises a substrate 21, supports 22a and 22b, movable beams 23a and 23b, a tabular member 24, a first electrode T11, a second electrode T12, and a third electrode T13. The supports 22a and 22b are fixed to the substrate 21 and extend upward (z direction) from the substrate 21. The pair of movable beams 23a and 23b connects the upper ends of the pair of supports 22a and 22b and the tabular member 24. The pair of movable beams 23a and 23b and the tabular member 24 are supported at a height that is separated from the substrate 21. The pair of movable beams 23a and 23b have low rigidity, and can be easily twisted.

In FIG. 2, the straight line that extends along the movable beams 23a and 23b is defined as a swing axis A1. The swing axis A1 has a shape extending in the y direction (column direction). The tabular member 24 includes a first end 24a and a second end 24b that face each other across the swing axis A1. Moreover, as shown in FIG. 4, the first electrode T11 is formed, so as to extend in the y direction, on the substrate 21 positioned opposing the first end 24a. In addition, the third electrode T13 is formed, facing the first electrode T11, at the lower face on the first end 24a side of the tabular member 24. Moreover, the second electrode T12 is formed, so as to extend in the y direction, on the substrate 21 positioned opposing the second end 24b. In addition, the third electrode T13 is formed, facing the second electrode T12, at the lower face on the second end 24b side of the tabular member 24.

The pair of movable beams 23a and 23b support the tabular member 24 about the swing axis A1 in a manner capable of swinging the tabular member 24, and exhibits returnability for causing the tabular member 24 to return to a posture that is parallel to the substrate 21. In addition, when force in the z-axis direction is applied to the first end 24a or the second end 24b, a moving part 107 swings relative to the substrate 21 about the swing axis A1.

Figure 5:
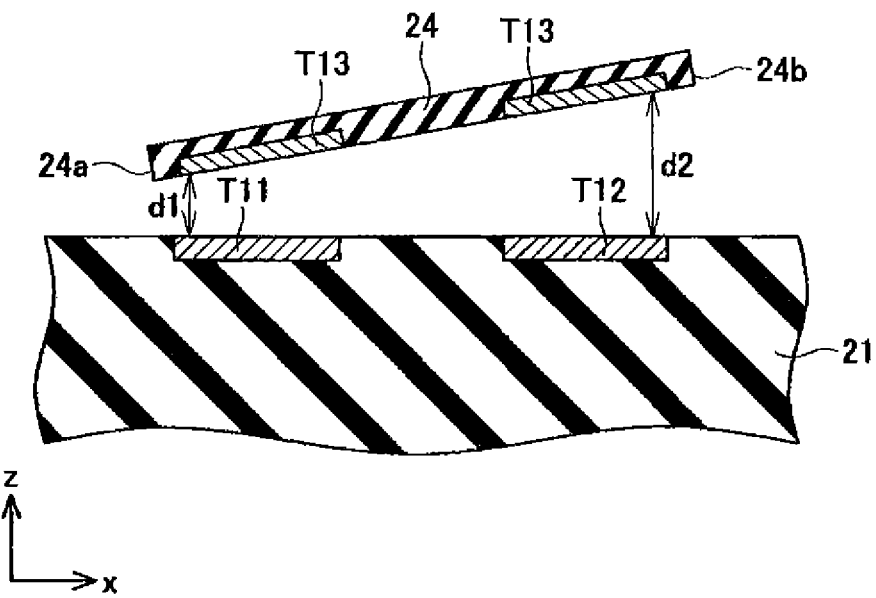
FIG. 5 shows a cross section of the optical deflector in one embodiment (No. 3).
Figure 6:
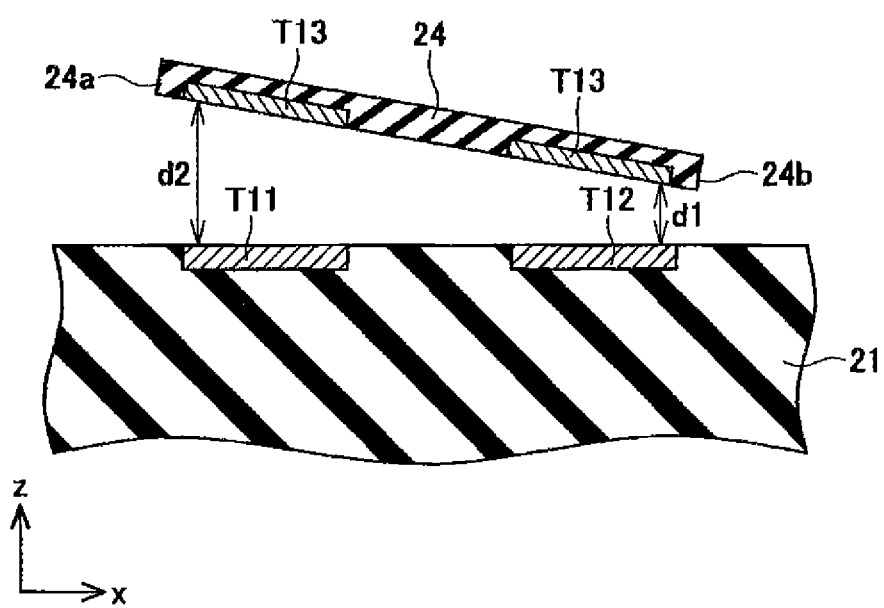
FIG. 6 shows a cross section of the optical deflector in one embodiment (No. 4).

The swinging posture of the tabular member 24 is now explained with reference to FIG. 4 to FIG. 6. As shown in FIG. 4, the distance between the first end 24a and the first electrode T11 and the distance between the second end 24b and the second electrode T12 when the tabular member 24 is in a posture that is parallel to the substrate 21 is defined as a distance d0. Moreover, as shown in FIG. 5, in the case of causing the first end 24a to swing in a manner approaching the first electrode T11, the distance between the first end 24a and the first electrode T11 is defined as approach distance d1 and the distance between the second end 24b and the second electrode T12 is defined as separation distance d2. In addition, the posture of FIG. 5 is defined as a left-side swinging posture. Moreover, as shown in FIG. 6, in the case of causing the second end 24b to swing in a manner approaching the second electrode T12, the distance between the second end 24b and the second electrode T12 is defined as an approach distance d1 and the distance between the first end 24a and the first electrode T11 is defined as a separation distance d2. In addition, the posture of FIG. 6 is defined as a right-side swinging posture.

As shown in FIG. 5 and FIG. 6, the tabular member 24 swings as a seesaw structure. In addition, as a result of having a seesaw structure, for instance, if the first end 24a becomes fixed to the first electrode T11, such fixation can be resolved by generating electrostatic attractive force to the second end 24b on the other side.

Figure 7:
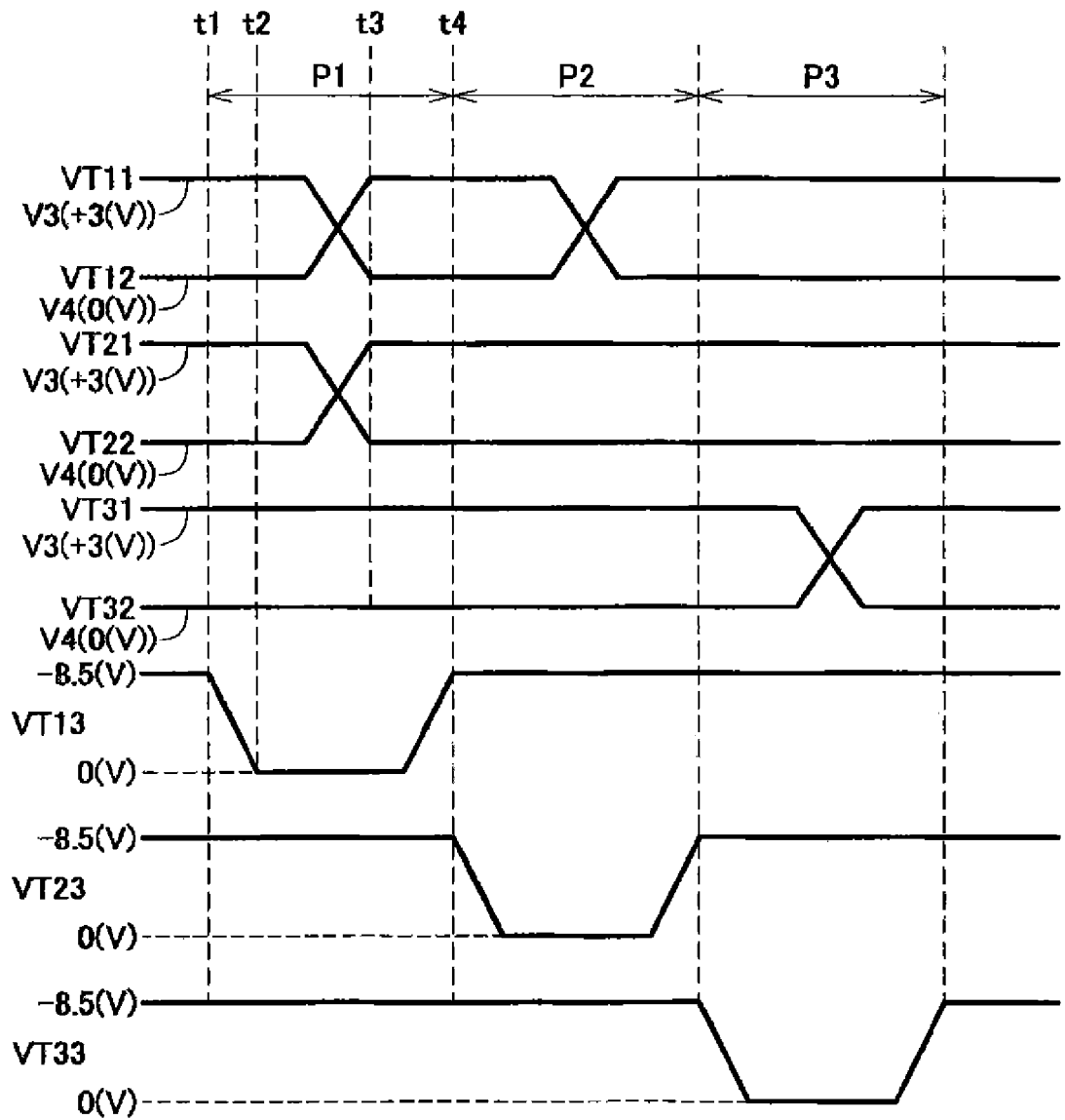
FIG. 7 shows a timing chart of the optical deflector in one embodiment.
Figure 8:
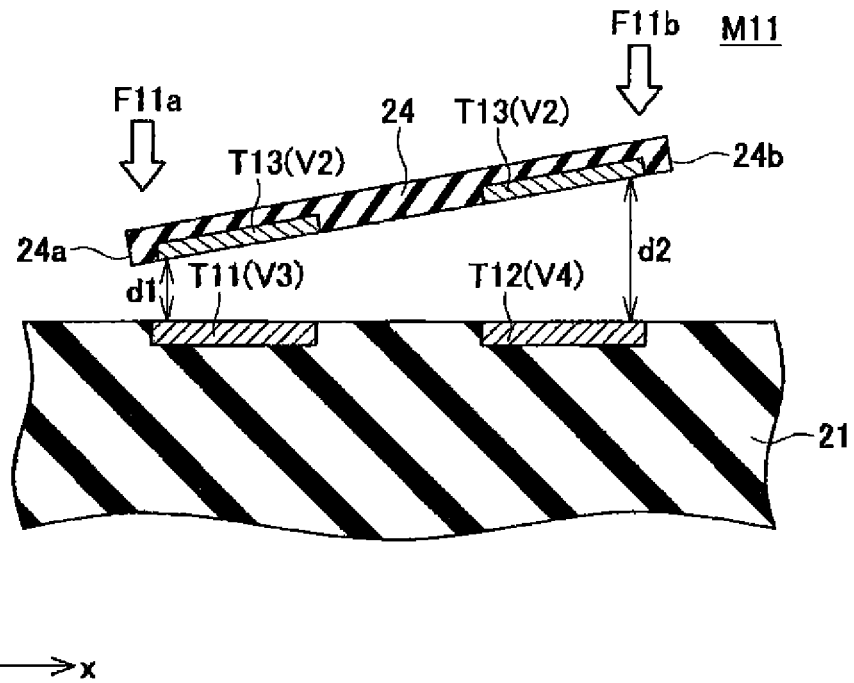
FIG. 8 shows a cross section of the optical deflector in one embodiment (No. 5).

The drive method of the optical deflector 10 is now explained. In the first embodiment, explained is a case where the drive method of a sequential refresh is performed. Sequential refresh is a drive method of writing a new swinging posture upon resetting the stored swinging posture to a horizontal state one row at a time. FIG. 7 shows a timing chart of voltages VT11 to VT31, voltages VT12 to VT32, and voltages VT13 to VT33. The voltages VT11 and VT12 are voltages to be applied to the pair of the first electrode T11 and the second electrode T12 of the first column C1, and are voltages that take on a value of either 3(V) or 0(V). Moreover, the voltages VT21 and VT22 are voltages to be applied to the pair of the first electrode T21 and the second electrode T22 of the second column C2, and are voltages that taken on a value of either 3(V) or 0(V). Moreover, the voltages VT31 and VT32 are voltages to be applied to the pair of the first electrode T31 and the second electrode T32 of the third column C3, and are voltages that take on a value of either 3(V) or 0(V). The voltages VT13 to VT33 are voltages to be applied to the third electrodes T13 to T33 of the first row R1 to the third row R3, and are voltages that taken on a value of a bias voltage V1 (−8.5(V)) or a reset voltage V2 (0(V)).

In a sequential refresh, the drive circuit 30 selects, in order and one by one, the first row R1 to the third row R3. In addition, the three operations of reset operation, swinging operation, and storage operation are performed to the movable units belonging to the selected row. The reset operation is the operation of returning the tabular member 24 to the non-swinging parallel state. The swinging operation is the operation of causing the tabular member 24 in the parallel state to swing in the intended direction. Here, the tabular member 24 of the movable unit that does not belong to the selected row is maintained in a previously assumed swinging posture. The storage operation is the operation of maintaining the swinging posture of the tabular member 24 until the next reset operation is performed.

In FIG. 7, the reset operation and the swinging operation regarding the first row R1 are performed during period P1, the reset operation and the swinging operation regarding the second row R2 are performed during period P2, and the reset operation and the swinging operation regarding the third row R3 are performed during period P3. The reset operation and the swinging operation regarding the first row R1 performed during period P1 are now explained in detail with reference to FIG. 8 to FIG. 15. Note that FIG. 11 to FIG. 15 are schematic diagrams showing the swinging posture of the movable units M11 to M33 in the matrix section 20.

Figure 11:
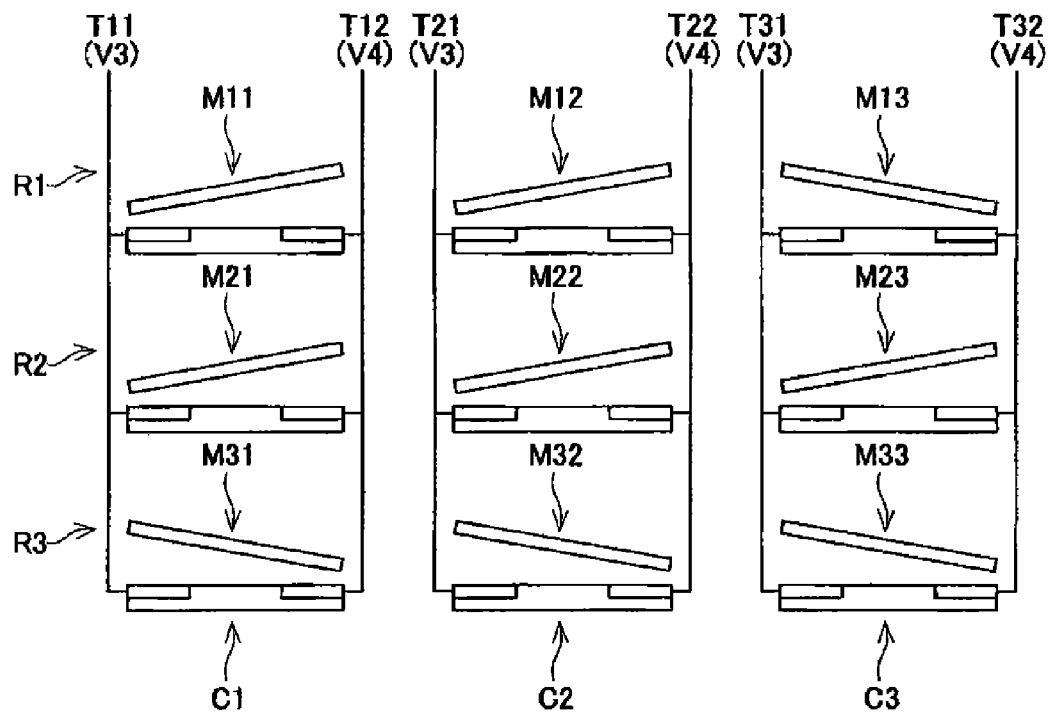
FIG. 11 shows a schematic diagram of the matrix section in the first embodiment (No. 1).

FIG. 11 shows the swinging posture of the matrix section 20 at time t1. The swinging posture of FIG. 11 is a state before starting the refresh of the first row R1. As shown in FIG. 11, the right-side swinging posture or the left-side swinging posture is maintained regarding all movable units M11 to M33.

The reset operation that is performed at time t2 (FIG. 7) is now explained. At time t2, the voltage VT13 applied to the third electrode T13 is changed from a bias voltage V1 (−8.5 (V)) to a reset voltage V2 (0(V)). As an example, the reset operation of the movable unit M11 is now explained with reference to FIG. 8. Here, the electrostatic attractive force between the third electrode T13 and the first electrode T11 of the first end 24a is defined as an electrostatic attractive force F11a, and the electrostatic attractive force between the third electrode T13 and the second electrode T12 of the second end 24b is defined as an electrostatic attractive force F11b. Consequently, a resultant force F11 which causes the tabular member 24 to swing in a counterclockwise direction in FIG. 8 can be obtained from following Formula (1).

$$F11 = F11a - F11b = (k \times (V2-V3)^2/d1^2) - (k \times (V2-V4)^2/d2^2) \quad \text{Formula (1)}$$

Figure 12:
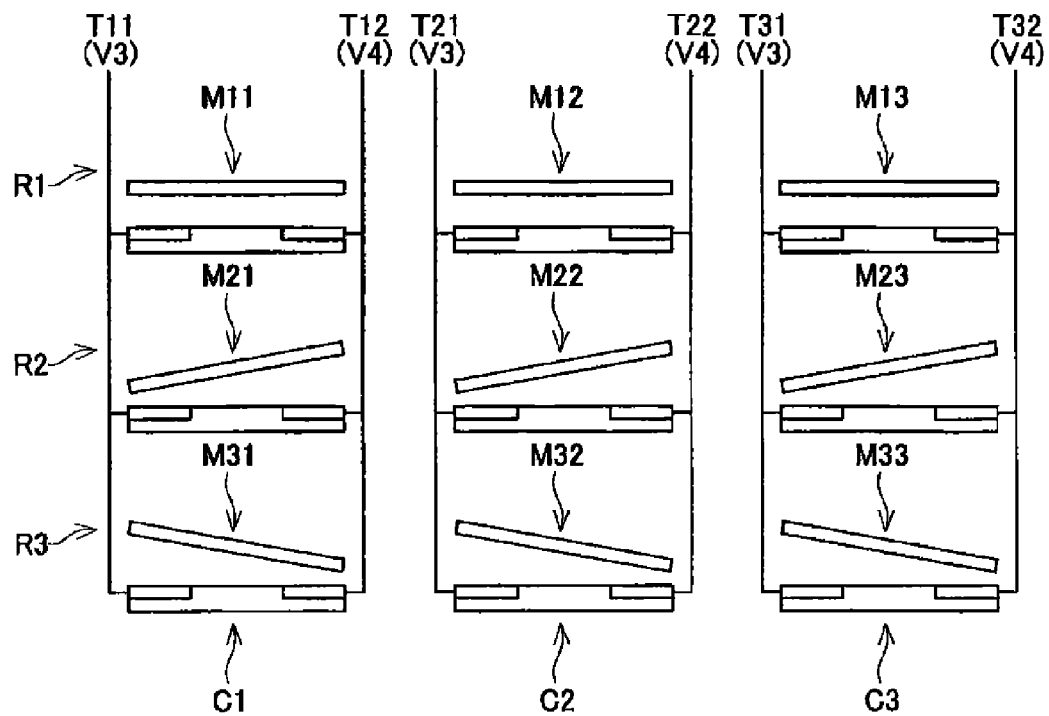
FIG. 12 shows a schematic diagram of the matrix section in the first embodiment (No. 2).

Here, a coefficient k is the coefficient that is decided based on permittivity, electrode area or the like. In addition, with the movable unit M11 of the present application, the relationship of the reset voltage V2, the approach voltage V3 and the separating voltage V4, the approach distance d1, and the separation distance d2 is defined so that the torque based on the resultant force F11 will be smaller than the returnability of the movable beams 23a and 23b. Thus, the tabular member 24 is returned to a non-swinging state based on the returnability of the movable beams 23a and 23b, and stabilized in a parallel state. Thus, as shown in FIG. 12, the movable unit M11 returns to a horizontal state. Note that the reset operation is also similarly performed in the movable units M12 and M13 belonging to the first row R1. Thus, as shown in FIG. 12, the movable units M12 and M13 also return to a horizontal state.

Figure 9:
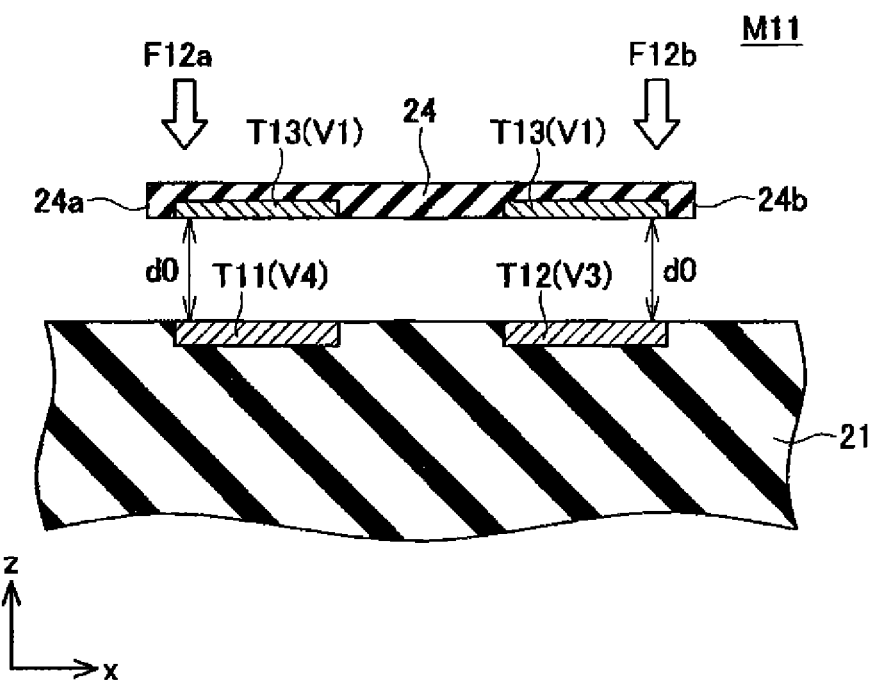
FIG. 9 shows a cross section of the optical deflector in one embodiment (No. 6).

The swinging operation that is performed at time t3 and time t4 (FIG. 7) is now explained. As an example, the operation of swinging the movable unit M11 to the right-side swinging posture is now explained with reference to FIG. 9. At time t3, as shown in FIG. 9, the tabular member 24 is in a state that is parallel to the substrate 21. In addition, the approach voltage V3 (+3(V)) is applied to the second electrode T12, and the separating voltage V4 (0(V)) is applied to the first electrode T11. In addition, at time t4, the voltage applied to the third electrode T13 is changed from the reset voltage V2 (0(V)) to the bias voltage V1 (−8.5(V)). Here, the electrostatic attractive force between the third electrode T13 and the first electrode T11 of the first end 24a is defined as an electrostatic attractive force F12a, and the electrostatic attractive force between the third electrode T13 and the second electrode T12 of the second end 24b is defined as an electrostatic attractive force F12b. Consequently, a resultant force F12 which causes the tabular member 24 to swing in a clockwise direction in FIG. 9 can be obtained from following Formula (2).

$$F12=F12b-F12a=(k\times(V1-V3)^2/d0^2)-(k\times(V1-V4)^2/d0^2) \quad \text{Formula (2)}$$

Figure 13:
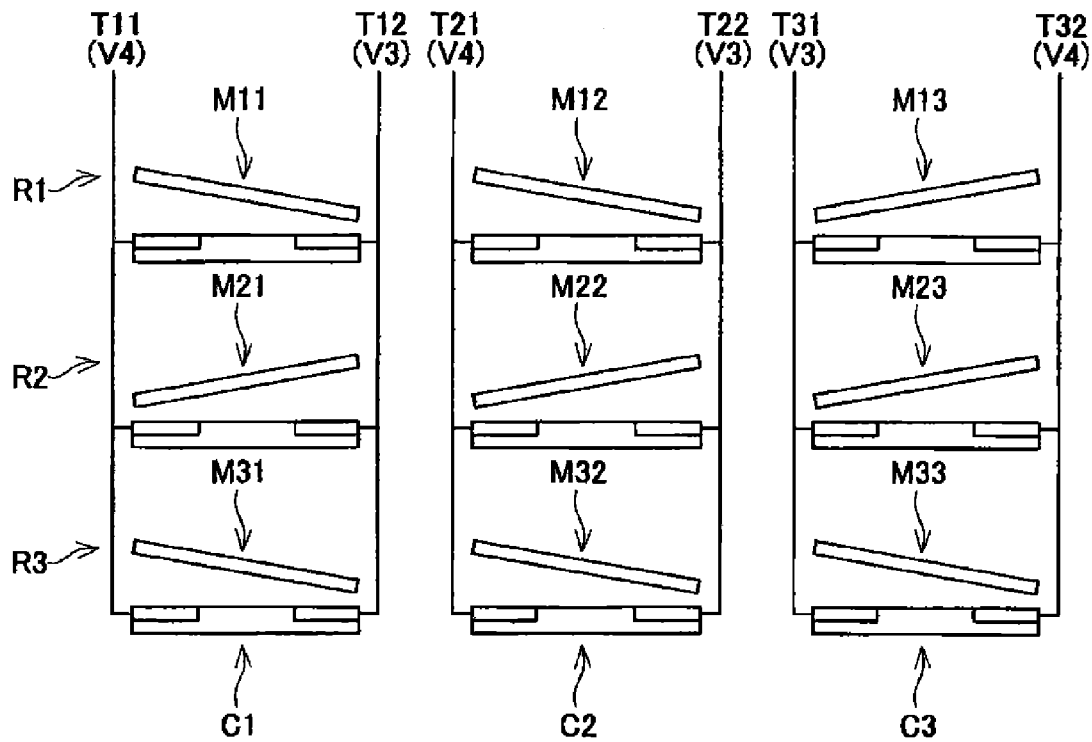
FIG. 13 shows a schematic diagram of the matrix section in the first embodiment (No. 3).

In addition, with the movable unit M11 of the present application, the relationship of the bias voltage V1, the approach voltage V3 and the separating voltage V4, and the distance d0 is defined so that the torque based on the resultant force F12 exceeds the returnability of the movable beams 23a and 23b. Thus, the tabular member 24 swings to the right side in the drawing so that the second end 24b approaches the second electrode T12. Thus, as shown in FIG. 13, the movable unit M11 swings to the right side in the drawing. Note that the swinging operation is also similarly performed to the movable units M12 and M13 belonging to the first row R1. Thus, as shown in FIG. 13, the movable unit M12 swings to the right side in the drawing, and the movable unit M13 swings to the left side in the drawing.

The operation of the movable units of the second row R2 and the third row R3 during the swinging operation of the movable units of the first row R1 is now additionally explained. At time t3 (FIG. 7), the voltage applied to the first electrode T11 is switched from the approach voltage V3 to the separating voltage V4, and the voltage applied to the second electrode T12 is switched from the separating voltage V4 to the approach voltage V3. Consequently, a command for taking on the right-side swinging posture is commonly issued to the movable units M11, M21, M31 belonging to the first column C1. Nevertheless, as described later, the order for taking on the right-side swinging posture is effective only for the refreshed movable unit M11. In addition, the non-refreshed movable units M21 and M31 ignore the command for taking on the right-side swinging posture.

The principle of the swinging posture command being ignored by the non-refreshed movable units is now explained. As an example, the operation in the movable unit M21 belonging to the second row R2 is now explained with reference to FIG. 10. The movable unit M21 is taking on a posture of swinging to the left side in the drawing at time t3 and time t4, and the third electrode T23 applies the bias voltage V1 to the tabular member 24.

Figure 10:
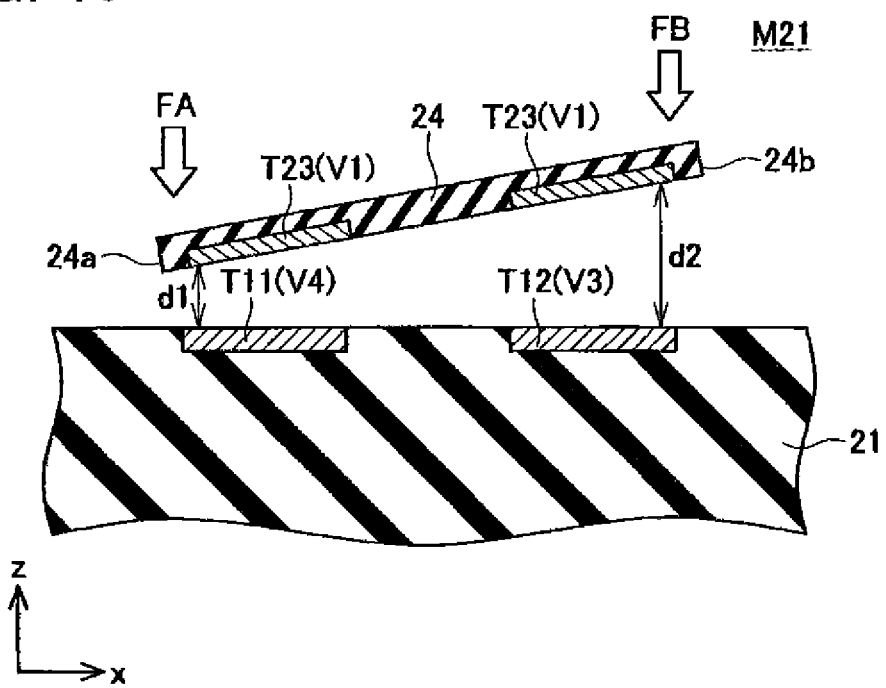
FIG. 10 shows a cross section of the optical deflector in one embodiment (No. 7).

In FIG. 10, when examining the first end 24a, the first end 24a and the first electrode T11 approach each other up to the approach distance d1, the bias voltage V1 (−8.5(V)) is applied to the third electrode T23, and the separating voltage V4 (0(V)) is applied to the first electrode T11. When the electrostatic attractive force is defined as an approach electrostatic attractive force FA, the approach electrostatic attractive force FA can be obtained from following Formula (3).

$$FA=k\times(V1-V4)^2/d1^2 \quad \text{Formula (3)}$$

Meanwhile, in FIG. 10, when examining the second end 24b, the second end 24b and the second electrode T12 are separated up to the separation distance d2, the bias voltage V1 is applied to the third electrode T23, and the approach voltage V3 (3(V)) is applied to the second electrode T12. When the electrostatic attractive force in the foregoing case is defines as a separation electrostatic attractive force FB, the separation electrostatic attractive force FB can be obtained from following Formula (4).

$$FB=k\times(V1-V3)^2/d2^2 \quad \text{Formula (4)}$$

In addition, if the approach electrostatic attractive force FA becomes greater than the separation electrostatic attractive force FB, so as long as the bias voltage V1 is being applied to the third electrode T23, even if the approach voltage V3 and the separating voltage V4 that could reverse the swinging posture are input to the first electrode T11 and the second electrode T12, the approach voltage V3 and the separating voltage V4 can be ignored. Thus, the relationship of the approach distance d1, the separation distance d2, the bias voltage V1, the approach voltage V3, and the separating voltage V4 for ignoring the approach voltage V3 and the separating voltage V4 can be obtained from following Formula (5).

$$FA>FB$$

$$k\times(V1-V4)^2/d1^2 > k\times(V1-V3)^2/d2^2$$

$$d2/d1 > (V1-V3)/(V1-V4) \quad \text{Formula (5)}$$

Here, the ratio of the separation distance d2 to the approach distance d1 ((separation distance d2)/(approach distance d1)) is defined as a distance ratio DR. Moreover, the ratio of the voltage difference between the bias voltage V1 and the approach voltage V3 relative to the voltage difference between the bias voltage V1 and the separating voltage V4 ((V1-V3)/(V1-V4)) is defined as a voltage ratio VR. Based on Formula (5), the magnitude relation of the approach electrostatic attractive force FA and the separation electrostatic attractive force FB is decided based on the magnitude relation of the distance ratio DR and the voltage ratio VR.

In addition, with the optical deflector 10 of the present application, the relationship of the bias voltage V1, the approach voltage V3, the separating voltage V4, the approach distance d1, and the separation distance d2 is defined so that the distance ratio DR is greater than the voltage ratio VR. In other words, the relationship of the distance and the voltage is defined so that the distance between the end and electrode is dominant over the voltage difference in the electrostatic attractive force. Consequently, so as long as the posture of the tabular member 24 is once decided, and so as long as the bias voltage V1 is continuously applied to the third electrode T23, even if a voltage that could reverse the posture is applied to the first electrode T11 and the second electrode T12, the swinging posture is not changed. In other words, the posture of the tabular member 24 can be stored by maintaining the state of continuously applying the bias voltage V1 to the third electrode T23.

Thus, as shown in the example of FIG. 13, with the movable unit M21 of the second row R2, a previously assumed swinging posture is maintained. Moreover, the previously assumed swinging posture is also similarly maintained in the movable units M22 and M23 of the second row R2 and the movable units M31 to M33 of the third row R3.

The storage operation that is performed during a period from time t4 onward (FIG. 7) is now explained. As an example, the storage operation of the movable unit M11 is explained. The storage operation of the movable unit M11 is performed as a result of the voltage applied to the third electrode T13 being maintained as the bias voltage V1 (−8.5(V)). Consequently, with the movable unit M11, the right-side swinging posture is maintained regardless of the voltage that is applied to the first electrode T11 and the second electrode T12. Note that the detailed explanation of the storage operation is omitted since it is performed based on the foregoing principle. Consequently, the writing during the period P1 is complete.

Figure 14:
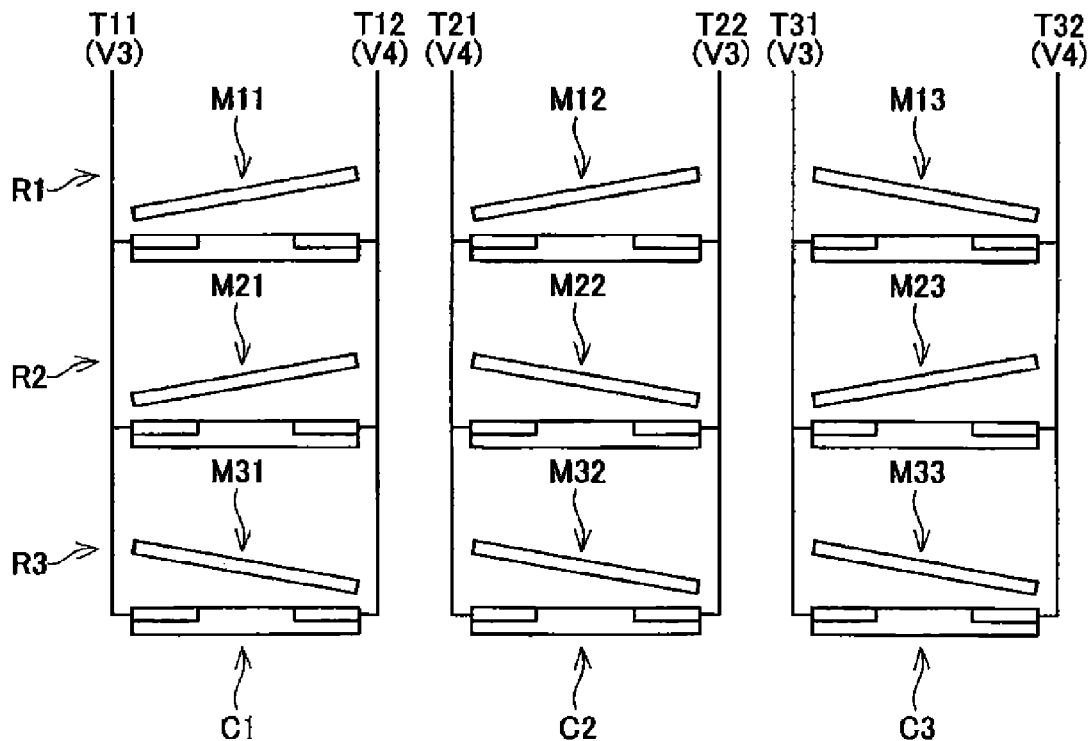
FIG. 14 shows a schematic diagram of the matrix section in the first embodiment (No. 4).
Figure 15:
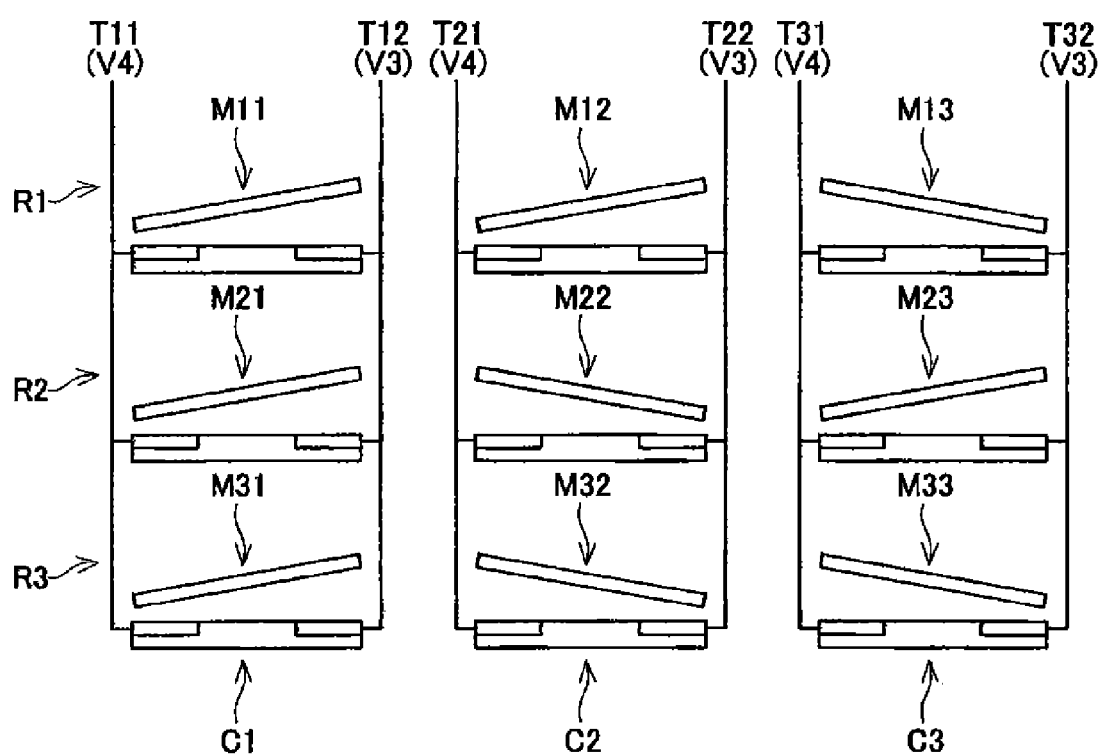
FIG. 15 shows a schematic diagram of the matrix section in the first embodiment (No. 5).

Similarly, during a period P2 (FIG. 7), rewriting of the second row R2 is performed. In addition, as shown in the example of FIG. 14, among the movable units belonging to the second row R2, only the swinging posture of the movable unit M22 is changed from the left-side swinging posture to the right-side swinging posture. Moreover, during a period P3, the rewriting of the third row R3 is performed. In addition, as shown in the example of FIG. 15, among the movable units belonging to the third row R3, only the swinging posture of the movable unit M31 is changed from the right-side swinging posture to the left-side swinging posture. Consequently, by controlling the respective movable units M11 to M33 to a posture corresponding to display data, one frame worth of a display frame can be set. In addition, as a result of the rewriting operation of the display frame being performed at a predetermined frequency, it is possible to realize an optical deflector to be mounted on an image forming apparatus such as a projector.

The effect of the optical defector 10 of the first embodiment is now explained. With the optical deflector 10 of the first embodiment, the relationship of the bias voltage V1, the approach voltage V3, the separating voltage V4, the approach distance d1, and the separation distance d2 is defined so that the distance between the end and electrode is dominant over the voltage difference. Consequently, the posture of the tabular member 24 can be stored by maintaining the state of applying the bias voltage V1 to the third electrode. Thus, it is possible to allow a state where the bias voltage V1 is simultaneously applied to the third electrode of a plurality of rows. Consequently, it is possible to avoid a situation where it is not possible to apply the bias voltage V1 to the third electrode of another row until the voltage applied to the third electrode of a certain row is changed from the bias voltage V1 to the reset voltage V2. Consequently, since it is not necessary to control the timing of applying the bias voltage V1 among the third electrodes of a plurality of rows, it is possible to simplify the control, and thereby downsize the drive circuit such as the row driver circuit 32.

Moreover, the driving speed of the matrix section 20 is decided based on the rise time of the voltage applied to the third electrode and the response time of the swinging operation of the tabular member 24. In addition, with the optical deflector 10 of the first embodiment, it is possible to allow a state where the bias voltage V1 is simultaneously applied to the third electrodes of a plurality of rows. Consequently, since a time margin is not required during the period from the voltage applied to the third electrode of a certain row being changed from the bias voltage V1 to the reset voltage V2, and the voltage applied to another third electrode being changed from the reset voltage V2 to the bias voltage V1, the rise time of the voltage applied to the third electrode can be shortened. Thus, the driving speed of the matrix section 20 can be increased.

Second Embodiment

The second embodiment is now explained. In the second embodiment, explained is a case where the drive method of a concurrent refresh is performed. The concurrent refresh is a drive method of writing a new swinging posture one row at a time after resetting the stored swinging posture to the horizontal state, for all of the movable units 20 that are arranged in a matrix. Note that, since the structure of the matrix section 20 and the drive circuit 30 is the same as the first embodiment, the detailed explanation thereof is omitted.

Figure 16:
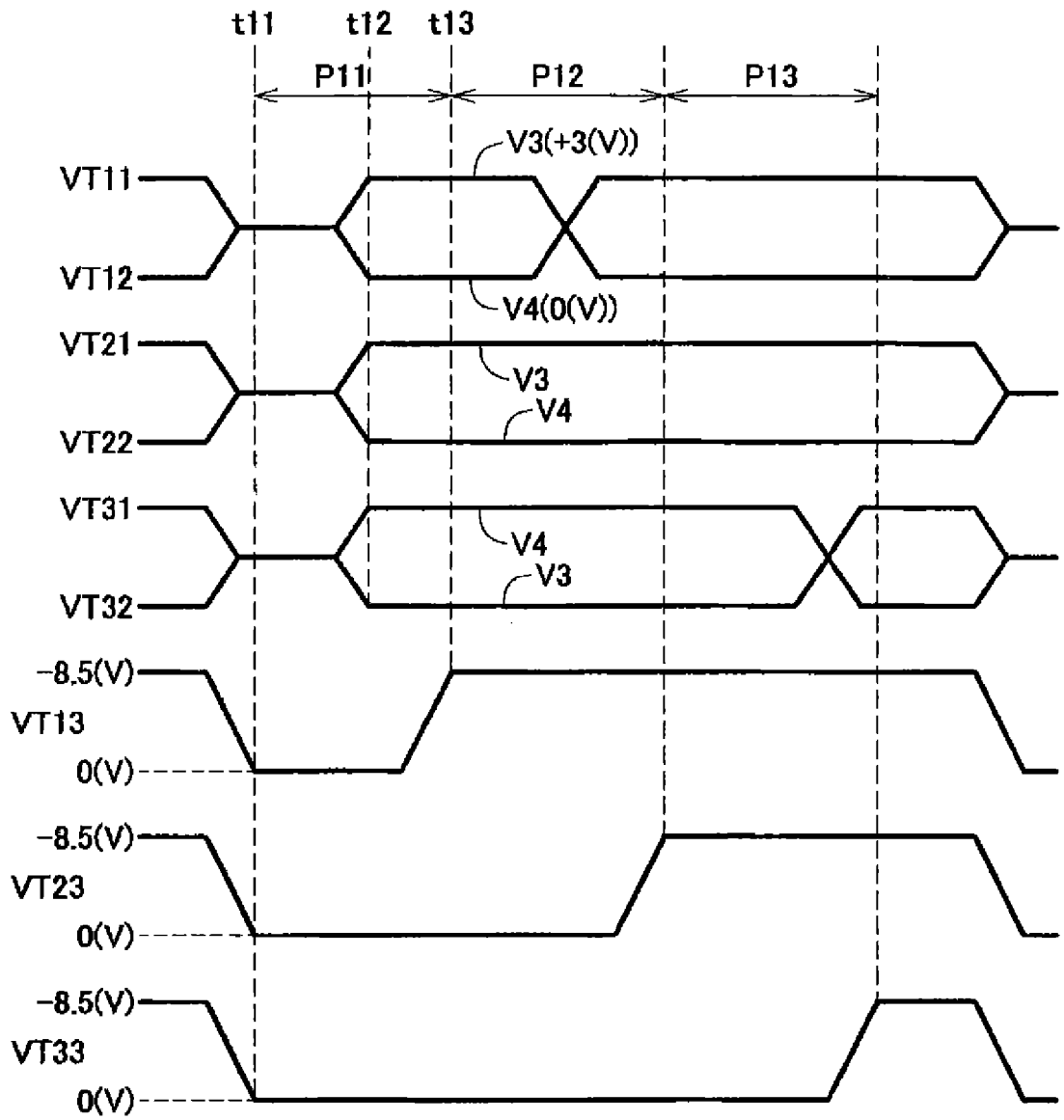
FIG. 16 shows a timing chart of an optical deflector in the second embodiment.

FIG. 16 shows a timing chart of the voltages VT11 to VT31, the voltages VT12 to VT32, and the voltages VT13 to VT33. In the concurrent refresh, the drive circuit 30 performs the concurrent reset operation for the first row R1 to the third row R3. In addition, the drive circuit 30 selects, in order and one by one, the first row R1 to the third row R3, and performs the swinging operation and the storage operation to the movable units belonging to the selected row. In FIG. 16, the refresh is performed at time t11, the swinging operation regarding the first row R1 is performed during a period P11, the swinging operation regarding the second row R2 is performed during a period P12, and the swinging operation regarding the third row R3 is performed during a period P13. Note that FIG. 17 to FIG. 20 are schematic diagrams showing the swinging posture of the movable units M11 to M33 in the matrix section 20.

Figure 17:
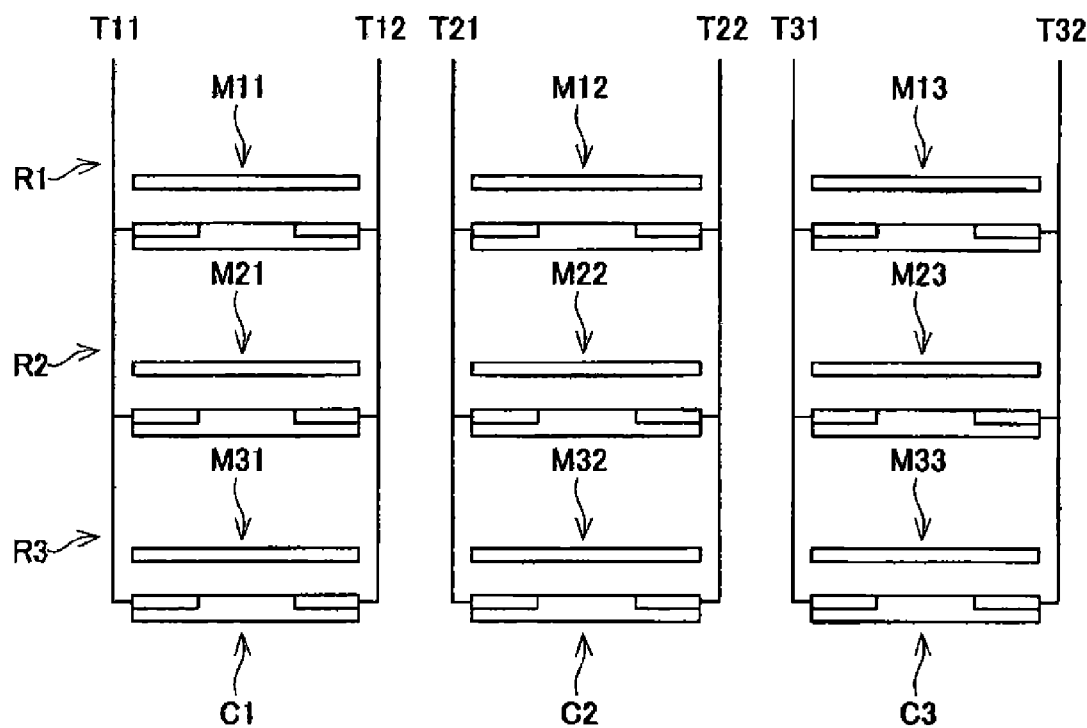
FIG. 17 shows a schematic diagram of a matrix section in the second embodiment (No. 1).

The concurrent reset operation performed at time t11 (FIG. 16) is now explained. At time t11, the voltages VT13 to VT33 are changed from the bias voltage V1 (−8.5(V)) to the reset voltage V2 (0(V)). Thus, as shown in FIG. 17, the posture of all movable units M11 to M33 is reset to the horizontal state.

Figure 18:
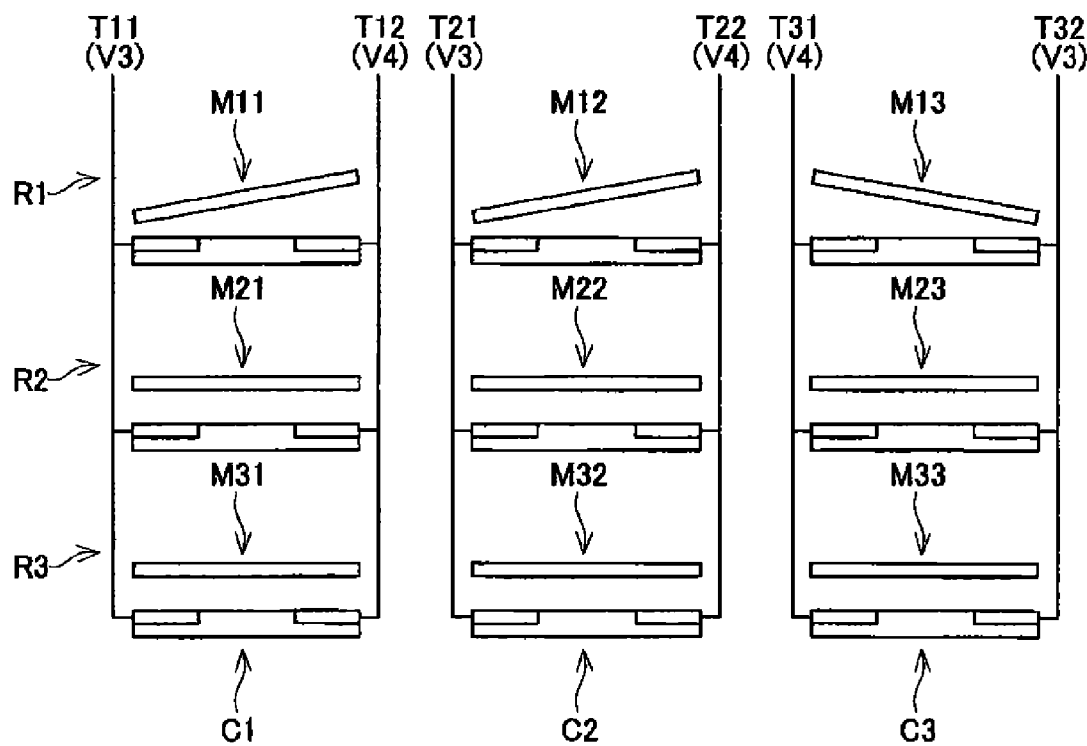
FIG. 18 shows a schematic diagram of the matrix section in the second embodiment (No. 2).

The swinging operation that is performed at time t12 and time t13 is now explained. As an example, the operation of swinging the movable unit M11 to the left-side swinging posture is now explained. At time t12, the approach voltage V3(+3(V)) is applied to the first electrode T11 and the separating voltage V4 (0(V)) is applied to the second electrode T12. In addition, at time t13, the voltage applied to the third electrode T13 is changed from the reset voltage V2 (0(V)) to the bias voltage V1 (−8.5(V)). Thus, as shown in FIG. 18, the movable unit M11 swings to the left side in the drawing. Note that the movable unit M12 also similarly swings to the left, side in the drawing and the movable unit M13 swings to the right side in the drawing in the movable units M12 and M13 belonging to the first row R1. Consequently, the swinging operation regarding the first row R1 during the period P11 is thereby complete.

Moreover, the operation of the movable unit M21 of the second row R2 and the movable unit M31 of the third row R3 during the period P11 is now explained. During the period P11, a reset voltage V1 is applied to the tabular member 24 of the movable units M21 and M31. Moreover, the tabular member 24 of the movable units M21 and M31 assumes a posture that is parallel to the substrate 21, and the distance between the first end 24a and the first electrode T11 and the distance between the second end 24b and the second electrode T12 are both distance d0. At time t12, the approach voltage V3 (+3 (V)) is applied to the first electrode T11 and the separating voltage V4 (0(V)) is applied to the second electrode T12. Thus, a command for taking on the left-side swinging posture is commonly issued to the movable units M11, M21, M31 belonging to the first column C1. Nevertheless, with the movable units M11 to M33 of the present application, as described above, the relationship of the reset voltage V2, the approach voltage V3 and the separating voltage V4, and the distance d0 is defined so that the torque that is generated while the reset voltage V2 is being applied to the tabular member 24 will be smaller than the returnability of the movable beams 23a and 23b. Thus, so as long as the reset voltage V2 is applied to the tabular member 24, the tabular member 24 does not swing and maintains a posture that is parallel to the substrate 21 irrespective of the voltage that is applied to the first electrode T11 and the second electrode T12. In other words, even if a voltage is applied to the first electrode T11 and the second electrode T12 for the processing of the movable unit M11, the tabular member 24 will not swing in the movable units M21 and M31 to which the reset voltage V2 is being applied. Note that the tabular member 24 also does not swing regarding the movable units M22, M32, M23, M33. Thus, as shown in FIG. 18, the posture of the movable unit M21 to M23 of the second row R2 and the movable unit M31 to M33 of the third row R3 is maintained in a horizontal state.

Figure 19:
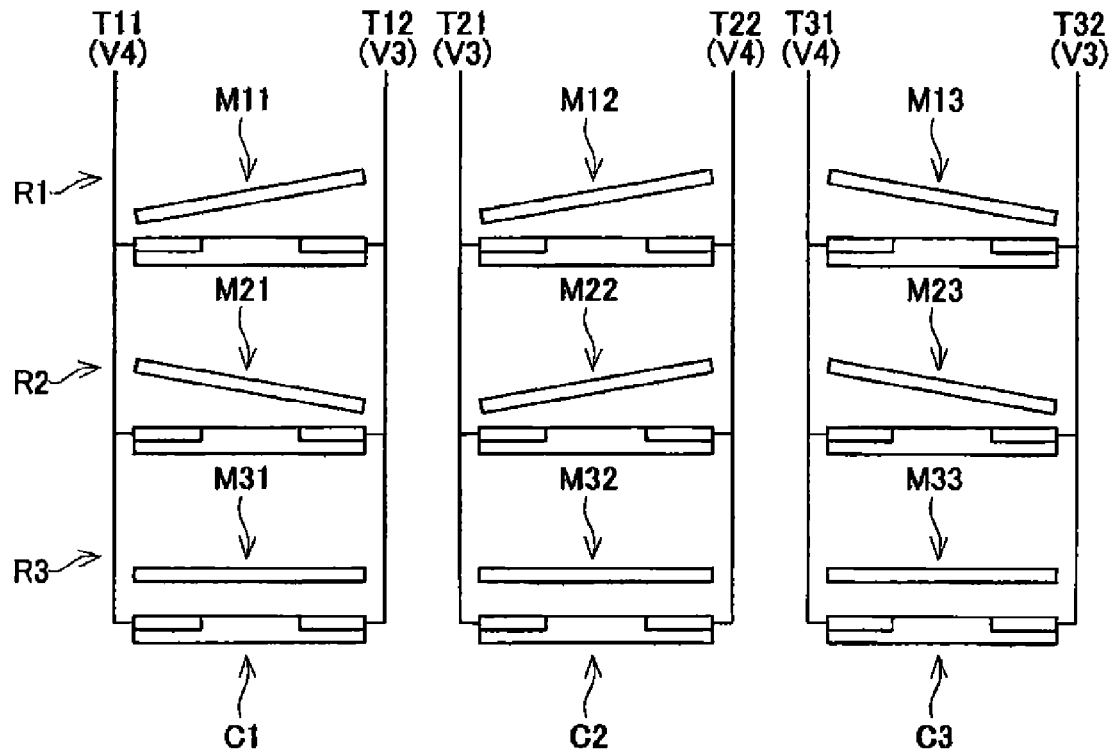
FIG. 19 shows a schematic diagram of the matrix section in the second embodiment (No. 3).
Figure 20:
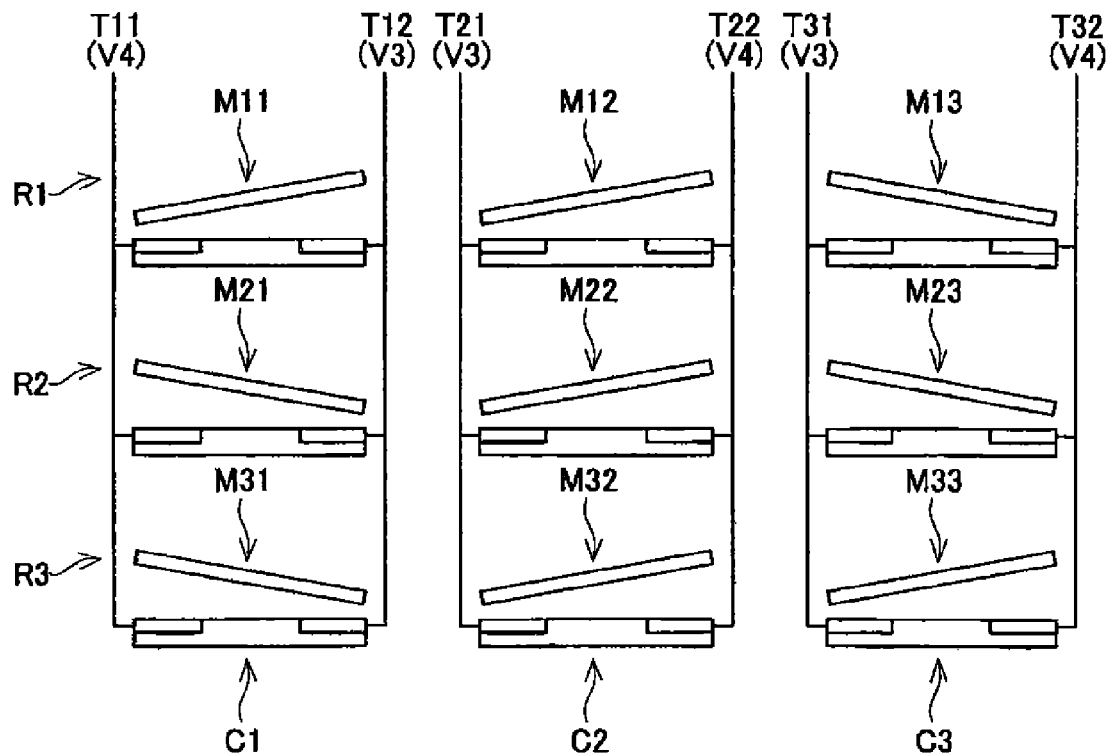
FIG. 20 shows a schematic diagram of the matrix section in the second embodiment (No. 4).

Similarly, during a period P12 (FIG. 16), the swinging operation regarding the second row R2 is performed. In addition, as shown in the example of FIG. 19, the movable units belonging to the second row R2 are set to the left-side swinging posture or the right-side swinging posture. Moreover, during a period P13, the swinging operation is performed regarding the third row R3. In addition, as shown in the example of FIG. 20, the movable units belonging to the third row R3 are set to the left-side swinging posture or the right-side swinging posture.

The effect of the second embodiment is now explained. With the drive method of the concurrent refresh in the second embodiment also, it is possible to allow a state where the bias voltage V1 is simultaneously applied to the third electrode of a plurality of rows. Consequently, since it is not necessary to control the timing of applying the bias voltage V1 among the third electrodes of a plurality of rows, it is possible to simplify the control, and thereby downsize the drive circuit such as the row driver circuit 32. Moreover, consequently, since a time margin is not required during the period from the voltage applied to the third electrode of a certain row being changed from the bias voltage V1 to the reset voltage V2, and the voltage applied to another third electrode being changed from the reset voltage V2 to the bias voltage V1, the rise time of the voltage applied to the third electrode can be shortened.

While specific embodiments of the present invention have been described in detail above, such description is for illustrative purposes only and is not intended to limit the scope and claims of the invention. Techniques described in the claims of the invention include various modifications and changes made to the specific examples illustrated above.

An optical deflector was taken as an example and explained in the present application, but the present invention is not limited to such a mode. For example, the present invention can also function as a storage apparatus which calls the stored state by detecting the capacitance between the tabular member 24 and the first electrode T11 or the capacitance between the tabular member 24 and the second electrode T12. Moreover, the present invention can also function as a relay device which physically changes the connection of the third electrode T13 between the first electrode T11 and the second electrode T12.

Furthermore, it is to be understood that the technical elements described in the present specification and the drawings exhibit technical usefulness solely or in various combinations thereof and shall not be limited to the combinations described in the claims at the time of filing. The techniques illustrated in the present specification and the drawings are to achieve a plurality of objectives at the same time, and technical usefulness is exhibited by attaining any one of such objectives.

What is claimed is:

1. A device capable of controlling a swinging state of a tabular member, comprising:
    a substrate;
    a plurality of movable units comprising a support, a movable beam, a tabular member, a first electrode and a second electrode; and
    a drive circuit, wherein
    the plurality of movable units is arranged in a matrix in a row direction and a column direction,
    the support is fixed to the substrate and extends upward from the substrate,
    the movable beam connects the support and the tabular member, the movable beam further supports the tabular member about a swing axis such that the tabular member can swing, and exhibit a returnability that causes the tabular member to return to a posture that is parallel to the substrate,
    the tabular member includes a first end and a second end that face each other across the swing axis, the tabular member further includes a third electrode, and at least a part of the tabular member is formed of a conductor,
    the first electrode is formed on the substrate in a position opposing the first end,
    the second electrode is formed on the substrate in a position opposing the second end,
    the swing axis provided to each of the movable units is shaped in a manner extending in the column direction,
    the first electrode of each of the movable units arranged in the column direction is commonly connected to the drive circuit, and the first electrode of each of the movable units of different columns is individually connected to the drive circuit,
    the second electrode of each of the movable units arranged in the column direction is commonly connected to the drive circuit, and the second electrode of each of the movable units of different columns is individually connected to the drive circuit,
    the tabular member of each of the movable units arranged in a row direction is commonly connected to the drive circuit, and the tabular member of each of the movable units of different rows is individually connected to the drive circuit, and
    when the drive circuit selectively applies first to fourth voltages to each of the plurality of movable units, by applying one of the third voltage and the fourth voltage to the first electrode of the moveable unit, and applying the other of the third voltage and the fourth voltage to the second electrode of the moveable unit, and when a voltage difference between the third voltage and the first voltage is greater than a voltage difference between the fourth voltage and the first voltage, one or more of the following events occur in the plurality of movable units:
    (a) in the movable unit in which the tabular member is not swinging and in which the first voltage has been applied to the third electrode of the tabular member, the tabular member swings in a direction approaching the electrode to which the third voltage has been applied;
    (b) in the movable unit in which the tabular member is not swinging and in which the second voltage has been applied to the third electrode of the tabular member, the tabular member does not swing; and
    (c) in the movable unit in which the tabular member is swinging and in which the first voltage has been applied to the third electrode of the tabular member, the tabular member maintains a previous swing posture, and in the movable unit in which the drive circuit has applied the second voltage to the third electrode of the tabular member, the tabular member returns to a posture that is parallel to the substrate,
    the drive circuit performing a concurrent reset operation configured to:
    (I) during a first step, apply the second voltage to the third electrode of the tabular members of the movable units belonging to all of the rows, all of the tabular members returning to a posture that is parallel to the substrate;
    (II) during a first part of a second step, select one selected row from among the rows having all of the tabular members in the posture that is parallel to the substrate;
    (III) during a second part of the second step, apply, in the selected row, the third voltage to the first electrode and apply the fourth voltage to the second electrode in the column where the tabular member is to approach the first electrode, and apply the fourth voltage to the first electrode and apply the third voltage to the second electrode in the column where the tabular member is to approach the second electrode;
(IV) during a third step switch the voltage that is being applied to the third electrode of the tabular members of the movable units belonging to the selected row after the second part of the second step (III); (C):
(V) during a fourth step, repeat the first part and the second part of the second step and third step until the voltage applied to the third electrode of all of the tabular members in all of the rows is switched to the first voltage; and
(VI) return to the first step when the fourth step is satisfied.

2. The device according to claim 1, wherein
the second voltage and the fourth voltage are a ground voltage, the third voltage is a negative voltage when the first voltage is a positive voltage, and the third voltage is a positive voltage when the first voltage is a negative voltage.

* * * * *